(12) United States Patent
Lee et al.

(10) Patent No.: US 7,191,097 B1
(45) Date of Patent: Mar. 13, 2007

(54) METHOD, APPARATUS, AND SYSTEM FOR ASSESSING CONDITIONS

(75) Inventors: Larry Alan Lee, Morgantown, WV (US); Sidney C. Soderholm, Morgantown, WV (US); Michael Flemmer, Bruceton Mills, WV (US); Jennifer L. Hornsby-Myers, Fairview, WV (US); Ramesh Gali, Fairfax, VA (US)

(73) Assignee: United States of America, Washington, DC (US)

( * ) Notice: Subject to any disclaimer, the term of this patent is extended or adjusted under 35 U.S.C. 154(b) by 0 days.

(21) Appl. No.: 10/815,111

(22) Filed: Mar. 31, 2004

(51) Int. Cl.
*G06F 19/00* (2006.01)
(52) U.S. Cl. .................. 702/183; 340/524; 340/532; 340/539.26; 340/539.29
(58) Field of Classification Search .................. None
See application file for complete search history.

(56) References Cited

U.S. PATENT DOCUMENTS

| 5,919,239 | A  |   | 7/1999  | Fraker et al.        |
|-----------|----|---|---------|----------------------|
| 6,031,454 | A  | * | 2/2000  | Lovejoy et al. ........ 340/539.29 |
| 6,282,410 | B1 | * | 8/2001  | Monsen et al. ........... 455/90.3 |
| 6,405,213 | B1 | * | 6/2002  | Layson et al. ........... 707/104.1 |
| 6,480,783 | B1 | * | 11/2002 | Myr ........................... 701/117 |
| 6,700,533 | B1 | * | 3/2004  | Werb et al. ............. 342/357.07 |
| 6,703,922 | B2 | * | 3/2004  | Shih et al. .............. 340/309.16 |
| 6,847,892 | B2 | * | 1/2005  | Zhou et al. .................. 701/213 |
| 6,891,476 | B2 | * | 5/2005  | Kitaguchi et al. ........ 340/573.1 |
| 6,940,403 | B2 | * | 9/2005  | Kail, IV ................. 340/539.12 |
| 2001/0047244 | A1 | * | 11/2001 | Harrison et al. ............ 701/213 |
| 2002/0016881 | A1 |   | 2/2002  | Hatsumoto            |
| 2002/0124631 | A1 |   | 9/2002  | Sunshine et al.      |
| 2002/0138197 | A1 | * | 9/2002  | Schramke et al. .......... 701/213 |
| 2002/0144537 | A1 |   | 10/2002 | Gordon et al.        |
| 2002/0195572 | A1 | * | 12/2002 | Kitaguchi et al. ........ 250/472.1 |
| 2003/0073406 | A1 | * | 4/2003  | Benjamin et al. ............. 455/41 |
| 2004/0004547 | A1 | * | 1/2004  | Appelt et al. ............ 340/573.1 |
| 2004/0119591 | A1 | * | 6/2004  | Peeters .................. 340/539.26 |
| 2005/0035857 | A1 | * | 2/2005  | Zhang et al. .......... 340/539.13 |

FOREIGN PATENT DOCUMENTS

GB 2373577 A 3/2001

* cited by examiner

*Primary Examiner*—Patrick J. Assouad
(74) *Attorney, Agent, or Firm*—Gifford, Krass, Sprinkle, Anderson & Citkowski, P.C.

(57) ABSTRACT

Real-time condition data indicative of conditions is collected from at least one sensor at a particular location or from a plurality of sensors at different locations over time. The data collected from different locations is time-synchronized to produce data indicative of conditions at the different locations at one or more times. Real-time position data indicative of the location(s) of the sensor(s) are also collected over time. The collected real-time condition data are correlated with the collected real-time position data to produce correlated data indicative of conditions at the one or more locations over time. At least a portion of the collected and correlated data is analyzed to determine conditions at the one or more locations over time.

6 Claims, 32 Drawing Sheets

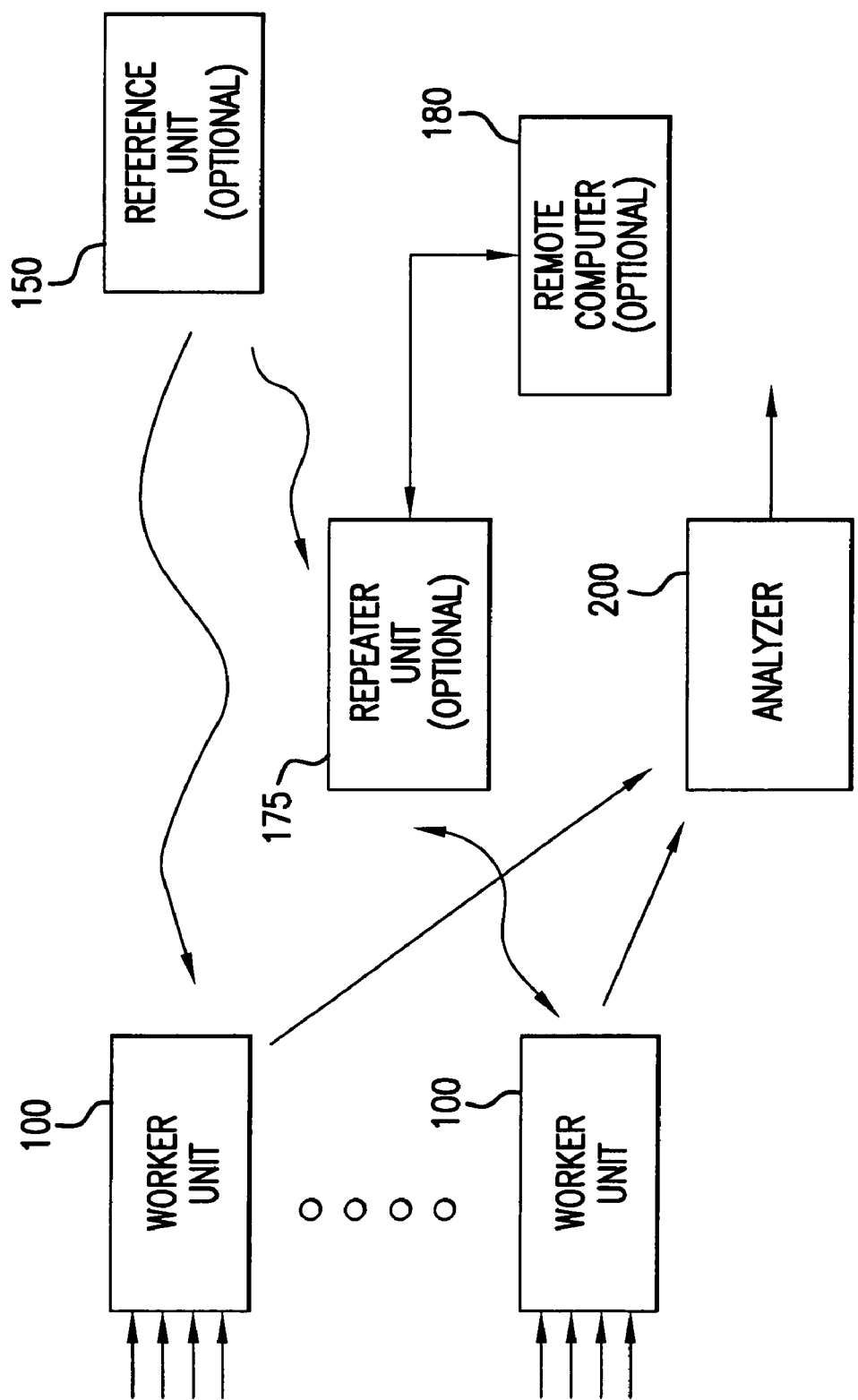

FIG. 5A

LPS MK3 PROGRAM INTERFACE

FILE  COMMANDS  HELP

SENSOR PORT ASSIGNMENT

LPS SENSOR PORT A
[NO SENSOR ATTACHED ▼]

LPS SENSOR PORT B
[NO SENSOR ATTACHED ▼]

LPS SENSOR PORT C
[NO SENSOR ATTACHED ▼]

LPS SENSOR PORT D
[NO SENSOR ATTACHED ▼]

DATA LOGGING INTERVAL

[ 1 ◀▶ ]

○ HOURS
○ MINUTES
◉ SECONDS

LPS UNIT ID [ ]
LPS TIME ZONE [ ]

LPS DATA RECEIVED

DATE/TIME [ ]
LATITUDE [ ]
LONGITUDE [ ]
ALTITUDE [ ]
POS. CONFIDENCE
INVALID QUALITY INFORMATION
LPS SENSOR PORT A [ ]
LPS SENSOR PORT B [ ]
LPS SENSOR PORT C [ ]
LPS SENSOR PORT D [ ]

FIG.5B

LPS MK3 PROGRAM INTERFACE

FILE  COMMANDS  HELP

| SENSOR PORT ASSIGNMENT | DATA LOGGING INTERVAL | LPS DATA RECEIVED |

LPS SENSOR PORT A
[UMd TEMPERATURE SENSOR ▶]

LPS SENSOR PORT B
[MIE PERSONAL DataRAM ▶]

LPS SENSOR PORT C
[NO SENSOR ATTACHED ▶]
[◀ ≡ ▶]
[MIE PERSONAL DataRAM]
[PhDS 4-GAS MONITOR]
[QUEST TECH. 2900 SLM]
[NO SENSOR ATTACHED ▶]

[ 1 ◀▷ ]

○ HOURS
○ MINUTES
◉ SECONDS

LPS UNIT ID
[          ]

LPS TIME ZONE
[          ]

DATE/TIME
[          ]

LATITUDE
[          ]

LONGITUDE
[          ]

ALTITUDE
[          ]

POS. CONFIDENCE
[INVALID QUALITY INFORMATION]

LPS SENSOR PORT A
[          ]

LPS SENSOR PORT B
[          ]

LPS SENSOR PORT C
[          ]

LPS SENSOR PORT D
[          ]

PAGE 8   SEC. 1   8/15   AT 7.2"   LN 15   COL. 1   REC TRK – EXT

LPS MK3 PROGRAM INTERFACE

FILE | COMMANDS | HELP

LOAD CONFIGURATION FILE
SAVE CONFIGURATION FILE
RESET INTERFACE – NEW UNIT
EXIT

LPS SENSOR PORT A
[UMd TEMPERATURE SENSOR ▸]

LPS SENSOR PORT B
[MIE PERSONAL DataRAM ▸]

LPS SENSOR PORT C
[NO SENSOR ATTACHED ▸]

LPS SENSOR PORT D
[NO SENSOR ATTACHED ▸]

DATA LOGGING INTERVAL

[ 1 ◂▸ ]

○ HOURS
○ MINUTES
⦿ SECONDS

LPS UNIT ID [ ]

LPS TIME ZONE [ ]

LPS DATA RECEIVED

DATE/TIME [ ]

LATITUDE [ ]

LONGITUDE [ ]

ALTITUDE [ ]

POS. CONFIDENCE
[INVALID QUALITY INFORMATION]

LPS SENSOR PORT A [ ]

LPS SENSOR PORT B [ ]

LPS SENSOR PORT C [ ]

LPS SENSOR PORT D [ ]

PAGE 9   SEC. 1   9/16   AT 3.4"   LN 14   COL 1   REC TRK – EXT

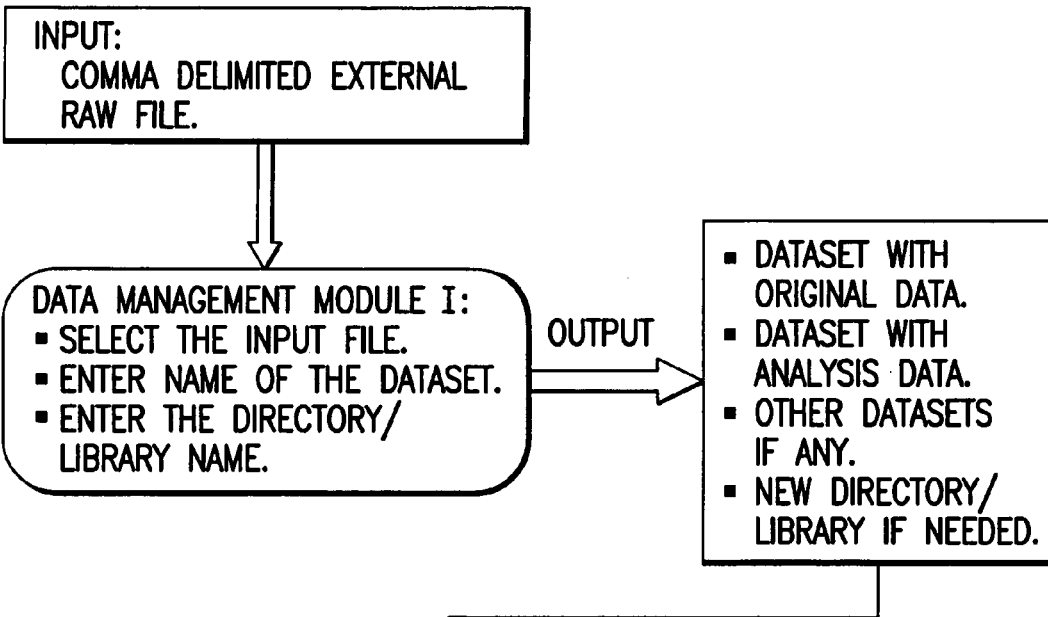
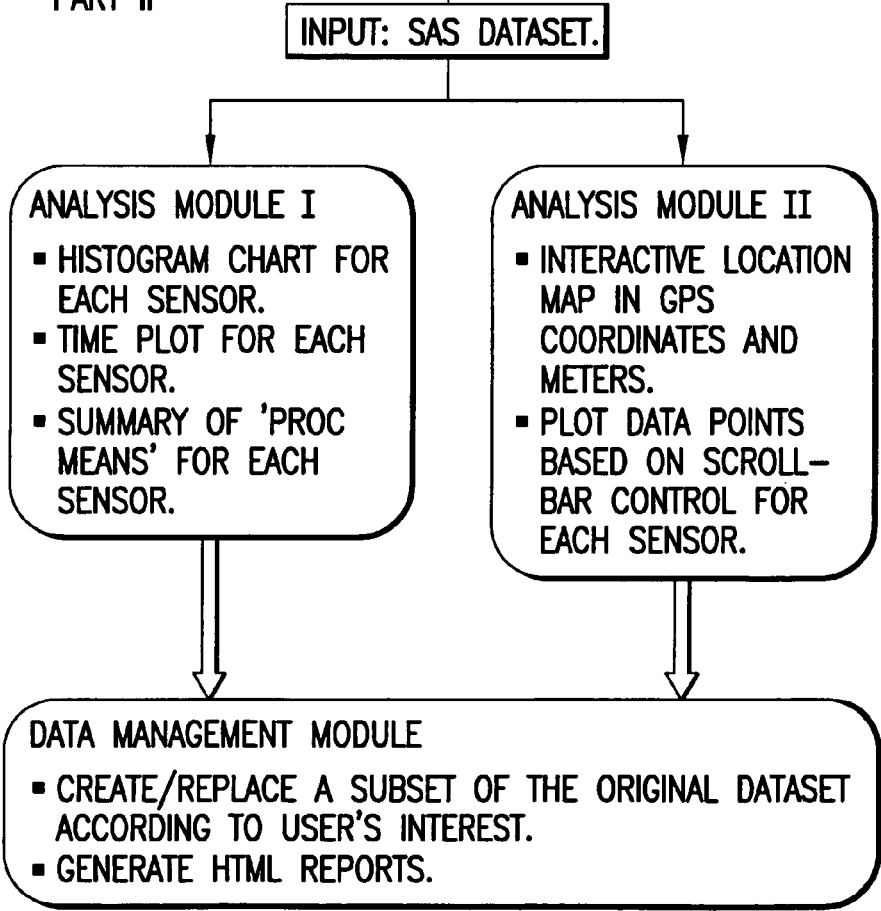
FIG. 6

LPS USER ANALYSIS SOFTWARE

CREATE A NEW DATASET FROM TEXT FILE

- SENSORS — 1000
  - TO | LA | LM | | SEC
- SELECT A FILE — 1010
  - A:\DATA020731r001.TXT | BROWSE
- ENTER DATASET NAME — 1020
  - CHARLOTTE
- SELECT LIBRARY NAME — 1030
  - MYSASLIB | BROWSE
- ANALYZE — 1040
- SET REFERENCE POINT — 1050
  - LONGITUDE
  - LATITUDE
  - SET

USE EXISTING SAS DATASET

- SELECT LIBRARY NAME
- ENTER DATASET NAME
- ANALYZE
- SET REFERENCE POINT
  - LONGITUDE
  - LATITUDE
  - SET

FIG. 10

| Obs | STAT | DUST | LAVG | LMAX |
|---|---|---|---|---|
| 1 | N | 2032.00 | 2032.00 | 2032.00 |
| 2 | MIN | 718.00 | 51.60 | 51.60 |
| 3 | MAX | 952.00 | 91.20 | 93.40 |
| 4 | MEAN | 763.48 | 64.55 | 66.07 |
| 5 | STD | 16.75 | 8.17 | 8.61 |
| 6 | N (>0) | 2032.00 | . | . |
| 7 | GMN | 763.31 | . | . |
| 8 | GSD | 1.02 | . | . |

FIG. 11A

| Obs | POSITION CONFI | STAT | DATETIME | LAT METERS | LON METERS | ALT METERS | DUST | LAVG | LMAX |
|---|---|---|---|---|---|---|---|---|---|
| 1 |  | N | 01JAN60:00:33:52.0 | 2032.00 | 2032.00 | 2032 | 2032 | 2032.0 | 2032.0 |
| 2 |  | MIN | 23MAY02:10:24:22.0 | -635.54 | -26.38 | 325 | 718 | 51.6 | 51.6 |
| 3 |  | MAX | 23MAY02:10:58:41.0 | 53.52 | 142.32 | 511 | 952 | 91.2 | 93.4 |
| 4 |  | MEAN | 23MAY02:10:41:29.9 | -380.63 | 69.36 | 356 | 763 | 64.5 | 66.1 |
| 5 |  | STD | 01JAN60:00:09:55.7 | 208.23 | 52.73 | 29 | 17 | 8.2 | 8.6 |
| 6 | 2DD | N | 01JAN60:00:04:16.0 | 256.00 | 256.00 | 256 | 256 | 256.0 | 256.0 |
| 7 | 2DD | MIN | 23MAY02:10:24:32.0 | -635.48 | -2.58 | 330 | 747 | 51.6 | 51.6 |
| 8 | 2DD | MAX | 23MAY02:10:58:05.0 | 52.29 | 142.32 | 389 | 812 | 81.2 | 83.2 |
| 9 | 2DD | MEAN | 23MAY02:10:44:14.5 | -469.84 | 79.39 | 362 | 762 | 65.3 | 66.7 |
| 10 | 2DD | STD | 01JAN60:00:06:37.8 | 145.32 | 49.49 | 15 | 10 | 8.0 | 8.4 |
| 11 | 2DU | N | 01JAN60:00:00:17.0 | 17.00 | 17.00 | 17 | 17 | 17.0 | 17.0 |
| 12 | 2DU | MIN | 23MAY02:10:33:37.0 | -551.90 | -11.77 | 344 | 746 | 51.7 | 52.0 |
| 13 | 2DU | MAX | 23MAY02:10:51:13.0 | -401.20 | 115.67 | 411 | 871 | 71.5 | 73.3 |
| 14 | 2DU | MEAN | 23MAY02:10:46:32.1 | -476.12 | 44.39 | 360 | 770 | 57.3 | 58.2 |
| 15 | 2DU | STD | 01JAN60:00:05:35.7 | 68.27 | 53.07 | 16 | 31 | 6.1 | 6.6 |
| 16 | 3DD | N | 01JAN60:00:23:03.0 | 1383.00 | 1383.00 | 1383 | 1383 | 1383.0 | 1383.0 |
| 17 | 3DD | MIN | 23MAY02:10:24:22.0 | -635.54 | -8.23 | 325 | 718 | 51.6 | 51.6 |
| 18 | 3DD | MAX | 23MAY02:10:58:41.0 | 53.52 | 142.19 | 405 | 952 | 91.2 | 93.4 |
| 19 | 3DD | MEAN | 23MAY02:10:39:19.2 | -321.99 | 78.58 | 348 | 764 | 65.1 | 66.6 |
| 20 | 3DD | STD | 01JAN60:00:10:45.6 | 216.45 | 51.17 | 16 | 18 | 8.2 | 8.6 |
| 21 | 3DU | N | 01JAN60:00:06:03.0 | 363.00 | 363.00 | 363 | 363 | 363.0 | 363.0 |
| 22 | 3DU | MIN | 23MAY02:10:29:47.0 | -627.36 | -26.38 | 332 | 734 | 51.6 | 51.6 |
| 23 | 3DU | MAX | 23MAY02:10:51:26.0 | -272.03 | 116.57 | 511 | 829 | 79.0 | 80.3 |
| 24 | 3DU | MEAN | 23MAY02:10:47:55.2 | -533.97 | 26.78 | 386 | 761 | 62.4 | 63.9 |
| 25 | 3DU | STD | 01JAN60:00:03:12.8 | 79.69 | 37.98 | 49 | 12 | 7.9 | 8.5 |
| 26 | CDR | N | 01JAN60:00:00:13.0 | 13.00 | 13.00 | 13 | 13 | 13.0 | 13.0 |
| 27 | CDR | MIN | 23MAY02:10:33:17.0 | -459.51 | 111.39 | 344 | 755 | 61.3 | 62.4 |
| 28 | CDR | MAX | 23MAY02:10:33:36.0 | -449.85 | 112.66 | 344 | 786 | 68.4 | 70.1 |
| 29 | CDR | MEAN | 23MAY02:10:33:27.3 | -455.80 | 112.18 | 344 | 769 | 64.5 | 66.1 |
| 30 | CDR | STD | 01JAN60:00:00:07.1 | 4.89 | 0.64 | 0 | 11 | 1.6 | 1.9 |

VARIABLE: DUST

| QUANTILES (DEFINITION 5) | |
|---|---|
| QUANTILE | ESTIMATE |
| 100% MAX | 952 |
| 99% | 826 |
| 95% | 790 |
| 90% | 780 |
| 75% Q3 | 768 |
| 50% MEDIAN | 759 |
| 25% Q1 | 754 |
| 10% | 751 |
| 5% | 749 |
| 1% | 741 |
| 0% MIN | 718 |

FIG. 11D

VARIABLE: LAVG

| QUANTILES (DEFINITION 5) | |
|---|---|
| QUANTILE | ESTIMATE |
| 100% MAX | 91.2 |
| 99% | 82.0 |
| 95% | 78.0 |
| 90% | 75.7 |
| 75% Q3 | 70.9 |
| 50% MEDIAN | 64.5 |
| 25% Q1 | 57.5 |
| 10% | 53.6 |
| 5% | 52.3 |
| 1% | 51.6 |
| 0% MIN | 51.6 |

FIG. 11E

VARIABLE: LMAX

| QUANTILES (DEFINITION 5) | |
|---|---|
| QUANTILE | ESTIMATE |
| 100% MAX | 93.40 |
| 99% | 83.90 |
| 95% | 79.70 |
| 90% | 77.60 |
| 75% Q3 | 73.00 |
| 50% MEDIAN | 66.10 |
| 25% Q1 | 58.85 |
| 10% | 54.30 |
| 5% | 52.90 |
| 1% | 51.60 |
| 0% MIN | 51.60 |

| TABLE OF CONTENTS | |
|---|---|
| | LPS ANALYSIS REPORT<br>THE MEANS PROCEDURE<br><br>| VARIABLE | N | MEAN | STD. DEV. | MINIMUM | MAXIMUM |<br>\|---\|---\|---\|---\|---\|---\|<br>\| DUST \| 2032 \| 763.4832677 \| 16.7478686 \| 718.0000000 \| 952.0000000 \|<br>\| LMAX \| 2032 \| 66.073868 \| 8.6120598 \| 51.6000000 \| 93.4000000 \|<br>\| LAVG \| 2032 \| 64.549154 \| 8.1664903 \| 51.6000000 \| 91.2000000 \|<br><br>LPS ANALYSIS REPORT<br><br>THE UNIVARIATE PROCEDURE<br>VARIABLE: DUST<br><br>\| QUANTILES (DEFINITION 5) \| \|<br>\|---\|---\|<br>\| QUANTILE \| ESTIMATE \|<br>\| 100% \| 952 \|<br>\| 99% \| 826 \|<br>\| 95% \| 790 \|<br>\| 90% \| 780 \|<br>\| 75% Q3 \| 768 \|<br>\| 50% MEDIAN \| 759 \| |

FIG.13

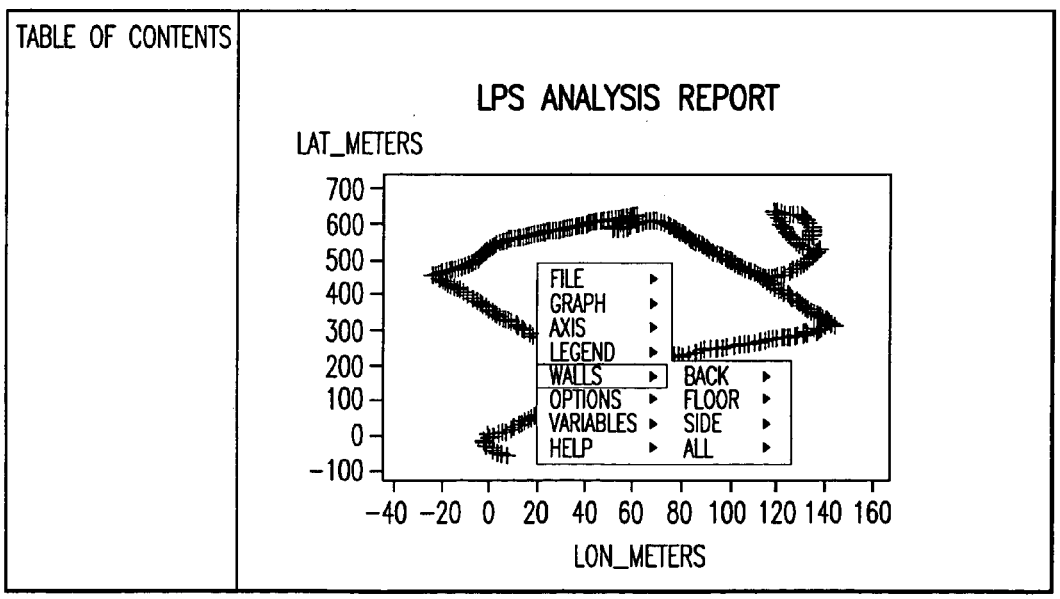

FIG.14

METHOD, APPARATUS, AND SYSTEM FOR ASSESSING CONDITIONS

GOVERNMENT LICENSE RIGHTS

Portions of this invention were made by at least one employee of the U.S. government, and the U.S. government may have certain rights in the invention.

BACKGROUND

The present invention is directed to a method, apparatus, and system for assessing conditions. In particular, the present invention is directed to a method, apparatus, and system for assessing conditions at one or more locations over time.

Workers in many outdoor occupations move about frequently during a typical workday. Certain workers, such as agricultural and construction workers, are particularly mobile. Workers in such environments are often subjected to a variety of potential hazards.

In environments such as these, it is important to have real-time information regarding conditions at a given location and a given time so that, e.g., a hazard can be identified, workers warned, and the exposure reduced to acceptable levels.

Various techniques have been developed for assessing and reporting conditions at locations over time. However, conventional techniques are typically complex and difficult to implement. Also, the information provided using conventional techniques is very limited.

There is thus a need for a technique for assessing conditions at one or more locations over time to provide useful information in a user-friendly manner.

SUMMARY

According to exemplary embodiments, a method, apparatus, and system are provided for assessing conditions, e.g., environmental conditions, internal conditions of an object or a subject, or level(s) of exposure, at one or more locations over time.

According to one embodiment, real-time condition data indicative of conditions is collected from at least one sensor at a particular location. Real-time position data indicative of the location of the sensor is also collected. The real-time condition data and the real-time position data are collected over time at one or more locations. The collected real-time condition data is correlated with the collected real-time position data to produce correlated data indicative of conditions at the one or more locations over time. At least a portion of the collected and correlated data is analyzed to determine conditions at the one or more locations over time.

According to another embodiment, real-time condition data indicative of conditions is collected from a plurality of sensors at one or more times, wherein at least two of the sensors are at different locations. The condition data collected from the plurality of sensors is time-synchronized to produce data indicative of conditions at the different locations at one or more times. Real-time position data indicative of the locations of the sensors may also be collected and correlated with the collected real-time condition data to produce correlated data indicative of conditions at the different locations at one or more times. At least a portion of the collected and correlated data may be analyzed to determine conditions at the different locations at one or more times.

According to exemplary embodiments, the real-time position data may be global positioning system (GPS) data. According to one embodiment, the accuracy of the position data may be improved with differential global positioning system (DGPS) data received using telemetry. According to another embodiment, the position data may be corrected using, for example, a wide area augmentation system (WAAS) without telemetry. According to yet another embodiment, the position data may be saved and corrected later using post processing software, e.g., for applications that do not benefit from real-time position data.

The objects, advantages and features of the present invention will become more apparent when reference is made to the following description taken in conjunction with the accompanying drawings.

BRIEF DESCRIPTION OF THE DRAWINGS

FIG. 1 illustrates an exemplary system for assessing conditions at one or more locations over time;

FIGS. 5A–5D illustrate exemplary screens that may be used in configuring an apparatus for collecting data;

FIG. 6 illustrates exemplary architecture of a statistical analysis software module;

FIG. 10 illustrates an exemplary screen used for initiating data analysis;

FIGS. 13–14 illustrate exemplary HTML reports generated by analyzing collected and correlated data;

DETAILED DESCRIPTION

Figure 2A:
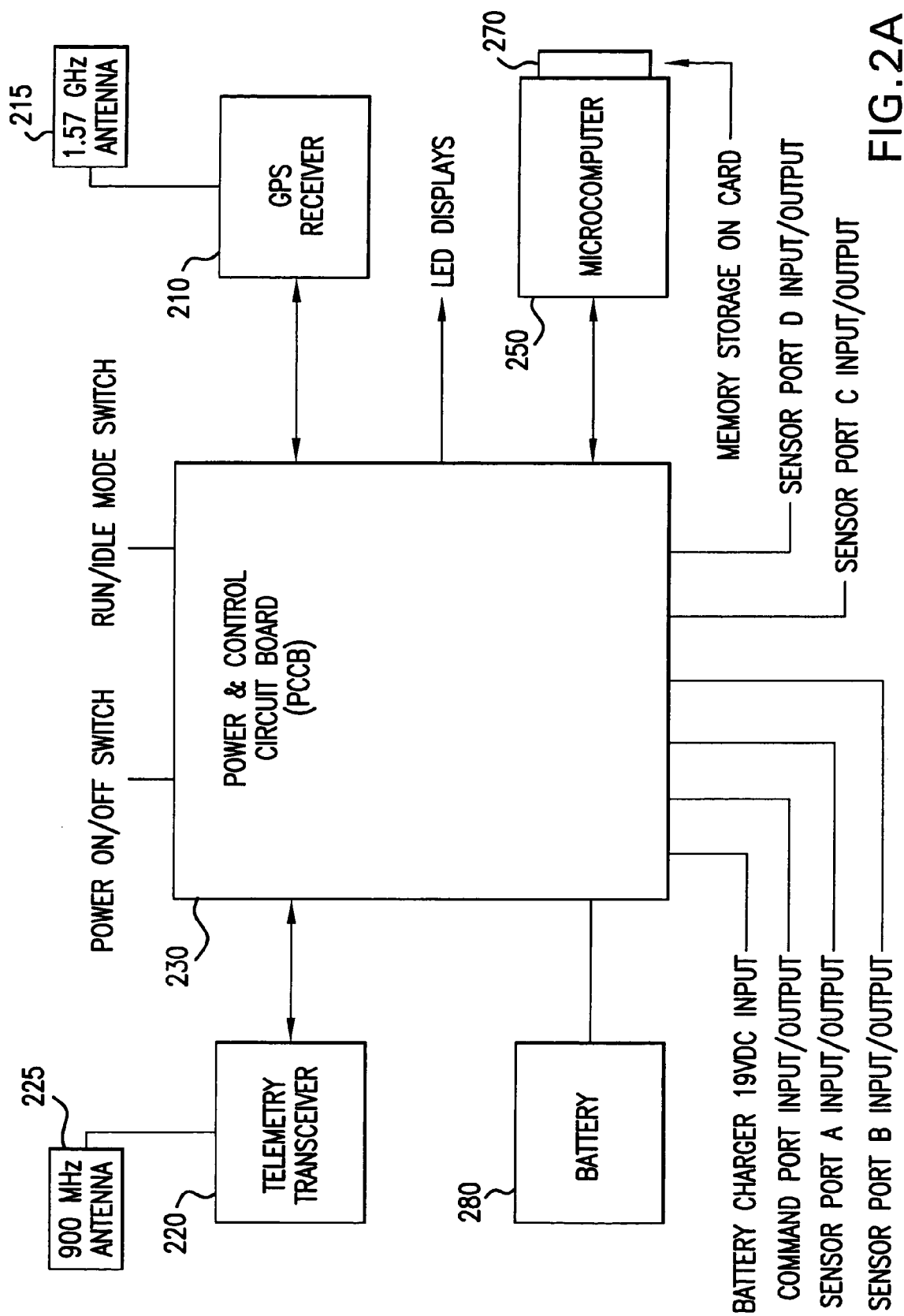
FIG. 2A illustrates in detail an exemplary apparatus for collecting data indicative of conditions at one or more locations over time.

According to exemplary embodiments, conditions at one or more locations and at one or more times are assessed by collecting data indicative of conditions and correlating the collected data with position data. The correlated data may then be analyzed to determine conditions at one or more locations at one or more times.

FIG. 1 illustrates an exemplary system for assessing conditions. The system includes worker units 100 for collecting and correlating data. According to an exemplary embodiment, the worker units 100 are mobile. The data collected by the worker units 100 may be correlated with position data.

The worker units 100 may be referred to as Local Positioning System (LPS) units. The position of the worker units 100 may be determined using a Global Positioning System (GPS).

To understand how the system works, it is helpful to understand the basics of GPS technology. GPS is the fastest, most portable method for obtaining outdoor position information. GPS uses a constellation of twenty-four active satellites in various orbital planes. A GPS receiver calculates the distance from three or more satellites in its vicinity and uses this information to calculate a specific geographic position on the Earth.

There is sufficient coverage in the GPS system such that it is possible to obtain three-dimensional position information at any time of the day and in any location on the globe, provided that the GPS signals are not obstructed. In order to resolve a three-dimensional position, the GPS receiver must be able to get signals from at least four of the satellites. The accuracy of the position fix is based somewhat on the position of the satellites at the time of the fix. The more scattered the satellites are with respect to one another, the better the accuracy. The closer the satellites are to each other, the poorer the accuracy.

An ideal location for using GPS is an open or raised area with a clear view of the horizon in all directions. As a user moves into a more recessed location, such as in a canyon, the accuracy of GPS is reduced. The same happens as the view of the horizon becomes more cluttered, such as in a city. Occasionally, the user may not be able to get any type of position fix because the GPS receiver is not able to acquire a sufficient number of satellites. Due to the low power of the signals, it may not be possible to get a GPS position fix in heavily forested areas or inside of buildings.

The United States government, which operates the GPS system, stipulates that the accuracy of standard GPS is 100 meters horizontal accuracy. Generally, the accuracy is much better. By applying position correction data, the position accuracy may be improved to a couple of meters at two sigma probability. Sometimes the improvement may be better, depending upon the quality of the GPS and corrections data.

Various errors are introduced into the system due to inaccuracies in satellite clock, receiver clock and ionosphere and troposphere interruptions. These errors reduce the accuracy of the calculated geographic position.

According to an exemplary embodiment, the accuracy of the position data may be improved with differential global positioning system (DGPS) data received from at least one reference unit 150 via telemetry. Alternatively, the position data may be corrected using a wide area augmentation system (WAAS), or a similar system, without using the reference unit 150. As another alternative, for applications that do not require or benefit from real-time position data, the position data may be saved on a worker unit 100 as raw internal state data that may later be corrected via post processing software and associated position correction data.

One or more repeaters 175 may be used to provide extended geographic coverage or to improve coverage in area where obstructions tend to attenuate the signal strength of a reference unit 150 or to allow remote personal and or/a remote computer 180 to transmit and/or receive information to/from the worker unit(s) 100.

The worker units 100 simultaneously log position information (whether or not improved or corrected) and data collected from one or more sensors included within or attached to the worker units. The system further includes an analyzer 200 for analyzing the logged collected and correlated data and producing user-friendly summaries and reports.

According to an exemplary embodiment, precise positioning coordinates are linked to real-time exposure levels. This may be helpful, e.g., to researchers and industry and regulatory personnel to enable them to collect and use condition data, such as, better understand exposure risks and optimize control. The reference unit 150, as well as the repeater unit 175, may be specifically designed for use in the assessment and control of occupational safety and health hazards. The worker units 100 may use industry-standard connectors to input data from portable exposure monitors. By linking worker unit location to exposure levels from real-time monitors, the worker units are able to identify and document where to focus exposure analysis and control efforts. Transmission of the data to a central location allows conditions to be monitored in near real time, so appropriate reactions can be initiated, if necessary. Post-processing of the collected and correlated data may enable researchers, regulatory inspectors, and industry safety and health personnel to map exposure intensity and location, reveal hot spots to identify sources, and provide exposure intensity distributions. Focused exposure control efforts, in turn, should allow a high return on investment, facilitating acceptance and implementation, with subsequent reductions in occupational injury and disease.

According to an exemplary embodiment, the analyzer 200 includes software for processing the sensed condition data correlated with the position data to produce user friendly outputs. For example, the analyzer 200 may plot the two-dimensional position in meters where data were taken, calculate and display descriptive statistics in tables, calculate and display distribution of values in graphs, allow subsets of the data to be specified (filtered), graph sensor data vs. time, and provide reports in, e.g., html files. The analyzer software significantly enhances the ability to analyze collected data and allows the user to easily identify overexposure and where they occurred in both space and time.

According to an exemplary embodiment, alarms may be used for providing alerts when alarm thresholds are reached, e.g., for hazardous conditions. For example, when alarm thresholds are exceeded, an audible alarm in the worker unit may sound. The worker units 100 may be configured to transmit such alarms to a remote site, thereby facilitating response and control. Alternatively, one or more remote computers 180 may send warnings to the worker units to activate alarms in the worker unit(s) 100.

The alarm may be automatically initiated at the sensor, e.g., when a threshold level is sensed. As an alternative or in addition, an alarm may be initiated based upon results of data analysis, e.g., when the collected data indicates hazardous exposures.

According to one embodiment, exposure assessments are automated by recording data about where and when hazards occur in an environment, such as a workplace. This allows the hazard to be identified and the exposure to be reduced to acceptable levels.

With a minimal learning curve, the system is straightforward to configure and used by non-technical users for conveniently and accurately identifying, documenting, and analyzing exposures. Moreover, by pinpointing problem sources, control technologies can be applied in an efficient, focused manner to save money and provider a high return on investment.

FIG. 2A illustrates in detail an exemplary apparatus for collecting data indicative of conditions. The apparatus includes a GPS receiver 210 for receiving time and position data. The GPS unit 210 may be implemented with, e.g., a CMC Electronics (formerly Canadian Marconi Company) Superstar OEM GPS receiver. The antenna 215 used to receive the GPS signals may be a Motorola OnCore GCNAC1111A, with the connector replaced with a male SMA connector.

The apparatus may also (optionally) include a telemetry transceiver 220 for receiving reference data corrections for higher resolution position discrimination. The transceiver 220 receives the differential corrections data via telemetry and an antenna 225. The telemetry transceiver unit 220 may be implemented with, e.g., a FreeWave DGRO 9TFS 900 MHz Spread Spectrum Wireless Data transceiver.

The corrections data may be received in a DGPS Radio Technical Commission for Maritime Services Special Committee 104 (RTCM-SC104) protocol and forwarded to the GPS receiver 210. In this way, the GPS receiver 210 operates as if it is connected to a differential corrections receiver. This arrangement allows multiple worker units in an area to operate from a single differential corrections receiver, reducing the size, weight, and cost of the individual worker units.

A battery 280, which may be rechargeable, provides power to the other components in the worker unit. The battery may be implemented with rechargeable lithium ion (Li-Ion) batteries.

The worker unit collects data from the various sensors in the form of, e.g., American Standard Code for Information Interchange (ASCII) text. Examples of sensor devices that may be used with the LPS system include MIE Personal DataRAM, Quest 2900 Sound Level Meter, Biosystems PhD5 Four-Gas Monitor, TSI Q-Trak Plus, Model 8554 Indoor Air Quality Monitor, and NIOSH Temperature Sensor.

The MIE Personal DataRAM is commonly used by industrial hygienists to measure dust exposure and is capable of transmitting that information in real time via a serial port. The data collected in an ASCII text format is parsed, processed, and stored in the log file. The default serial connection data for this sensor is 4800 baud, 8 data bits, 1 stop bit, none parity.

The Model 2900 Sound Level Meter (SLM) manufactured by Quest Technologies, Inc. is able to provide sound level data in real time via a serial port. It is also capable of being programmed by the serial port as well. This feature is especially appealing since it allows the LPS worker unit to program the SLM before collecting data, thus ensuring that the SLM's settings have not been altered by a previous operator. The default serial connection data for this sensor is 9600 baud, 8 data bits, 1 stop bit, none parity.

Biosystems, a division of Bacou-Dalloz, has developed a modified PhD5 four-gas monitor to provide real-time serial output. The format provides the required data and can accommodate the various types of sensor options available for the PhD5 unit. This variant of the PhD5 is referenced as COR# 121802, Code# 46. The default serial connection data for this sensor is 19200 baud, 8 data bits, 1 stop bit, none parity.

The Q-Trak Plus, Model 8554 has an undocumented capability of providing sensor data via a serial port. The device must be queried each time sensor data is required. Once queried, the Model 8554 provides its data in an ASCII text format. The default serial connection data for this sensor is 9600 baud, 8 data bits, 1 stop bit, none parity.

The NIOSH temperature sensor is a device purchased as a kit and based on the Dallas Semiconductor DS 1820 temperature sensor and utilizing a Microchip PIC processor. It provides real-time temperature information once every two seconds. The default serial connection data for this sensor is 2400 baud, 8 data bits, 1 stop bit, none parity.

Data collected from the sensors may be logged at a configured interval. The data may be stored on a commercially available compact flash card.

Data collected from the sensors, such as environmental or industrial hygiene data, is fed to a microcontroller/microcomputer 250 via a Power and Control Circuit Board (PCCB) 230. The microcontroller 250 correlates the sensed data with time and position information received by the antenna 215 and delivered to the GPS unit 210. The GPS data may be corrected with DGPS data received by the antenna 225, delivered to the telemetry unit 220. The date and time may be obtained from the microcontroller's on-board real-time clock that has been reset with the GPS time and adjusted for the configured time zone and either Standard or Daylight Savings Time. This correlation may be performed based, e.g., on a program loaded via a flash card 270. The correlated data may be logged at a configured time into a memory, e.g., a non-volatile memory on the microcontroller 250 and/or a flash card memory 270. The flash card 270 may be removed from the worker unit and placed in a PC, laptop, PDA, or the like, for data retrieval. The data logged may include date, time, GPS/DGPS position, GPS quality, and the most current sensor data. The data may be logged directly as it is received and/or after correlation. Also, the data may be downloaded directly from the worker unit to a computer either in addition to or instead of being logged. In addition, the data may be transferred in real-time by telemetry to a central receiving station. The data may then be mapped and analyzed using, e.g., a statistical analysis software program specially written for this purpose.

According to one embodiment, the worker unit has no screen or keypad. Thus, configuration information is entered via the command port by using an interface program running on a standard personal computer or laptop. The operator can configure each sensor port to work with a specific device, set the interval for data logging, and set the local time zone. The worker unit retains the most recent configuration information and automatically configures itself to the last known configuration when powered on.

According to an exemplary embodiment, the configuration software may be ported to operate on, e.g., an HP 320XL palmtop computer running the Windows CE operating system. This software may also be ported to other platforms, such as the Compaq iPaq and the Palm Pilot series of PDAs.

According to an exemplary embodiment, interconnection of some of the telemetry transceiver 220, GPS receiver 210, and microcontroller 250 inputs and/or outputs and power from the battery 280 may be routed through the PCCB 230. Details of an exemplary PCCB are shown in FIG. 2B.

Figure 2B:
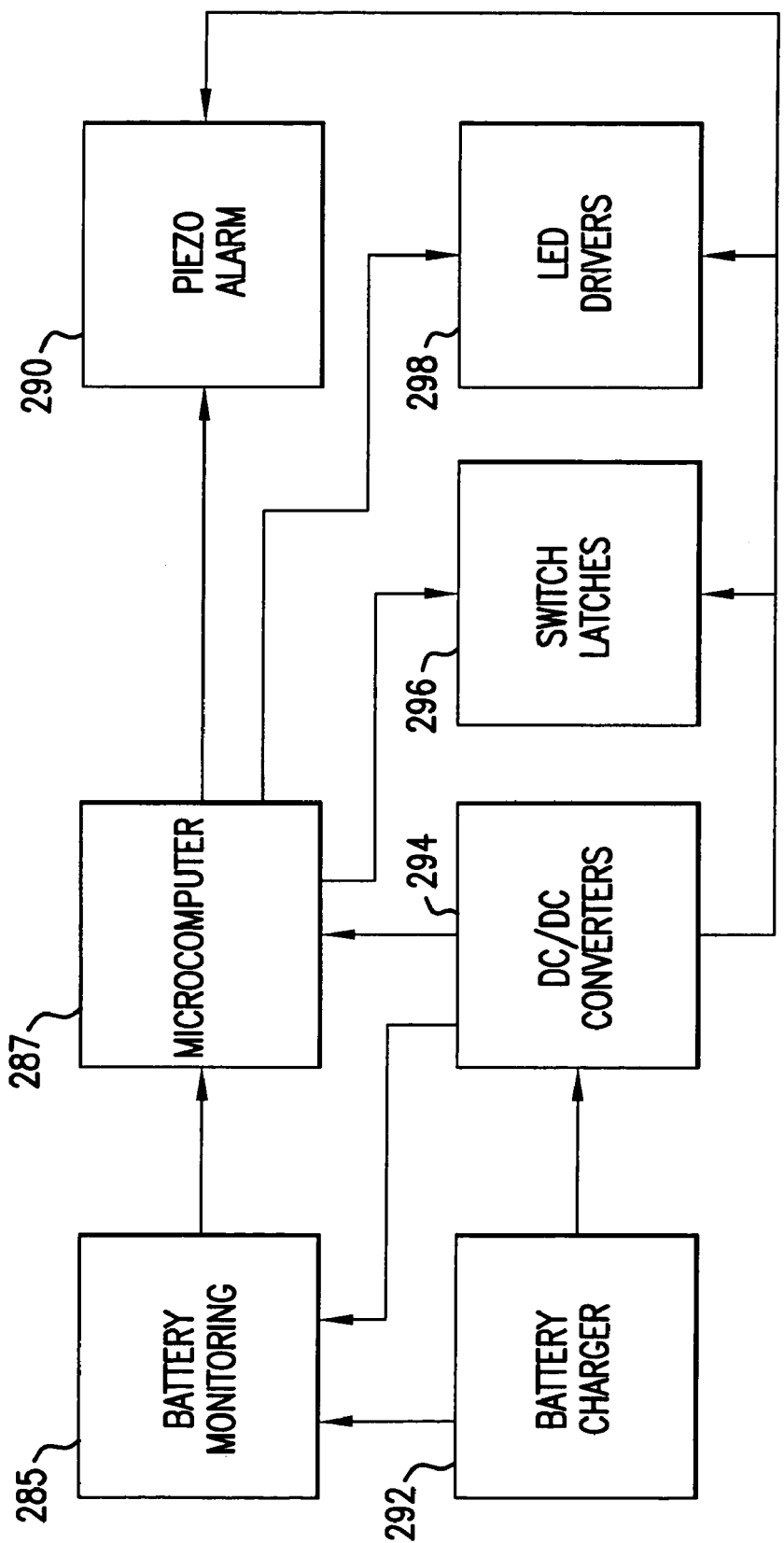
FIG. 2B illustrates in detail an exemplary Power and Control Circuit Board (PCCB) which may be included in the exemplary apparatus shown in FIG. 2A.
Figure 3A:
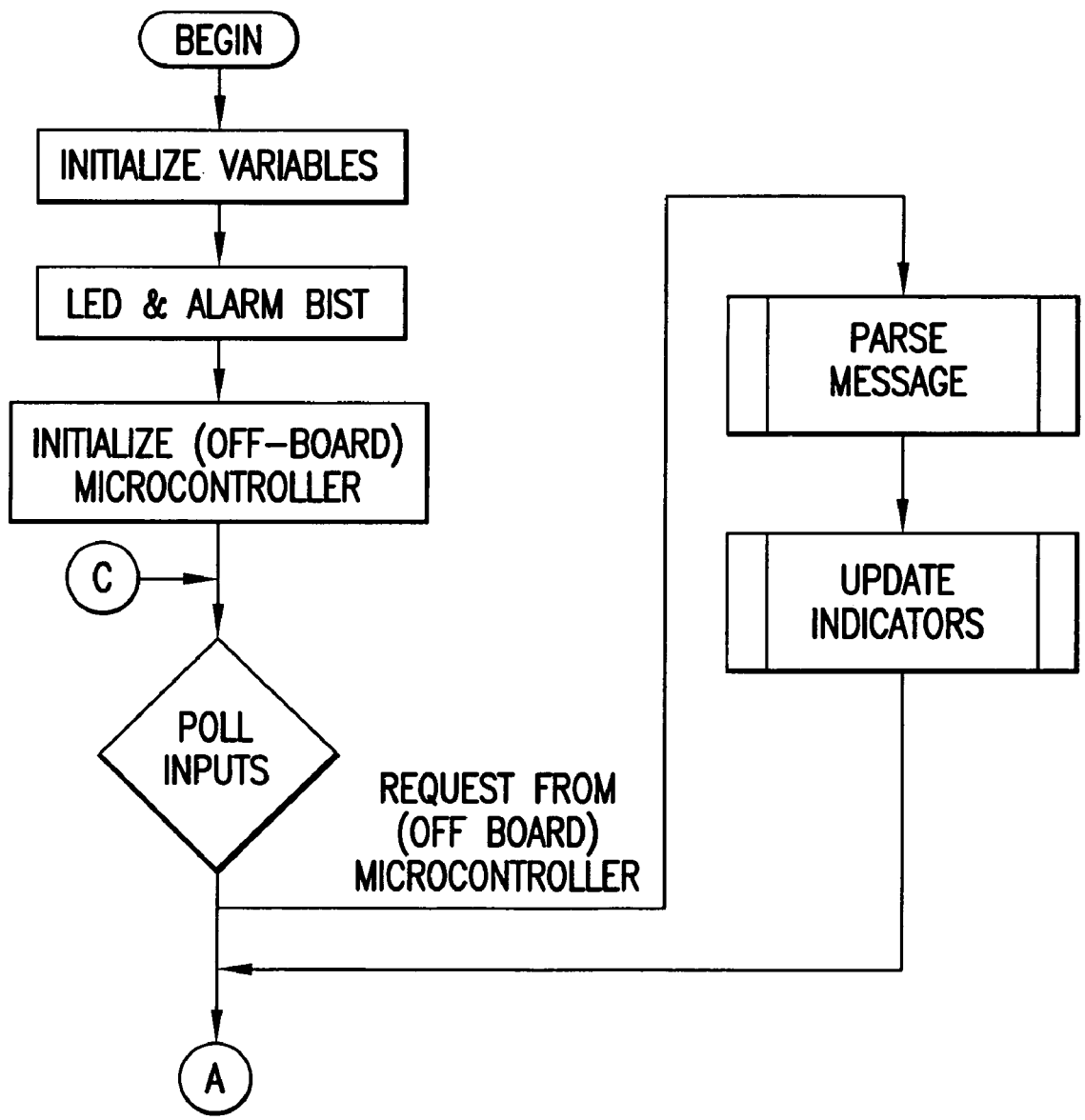
FIGS. 3A–3C depict a high level flowchart of exemplary processes performed by the PCCB firmware.
Figure 3B:
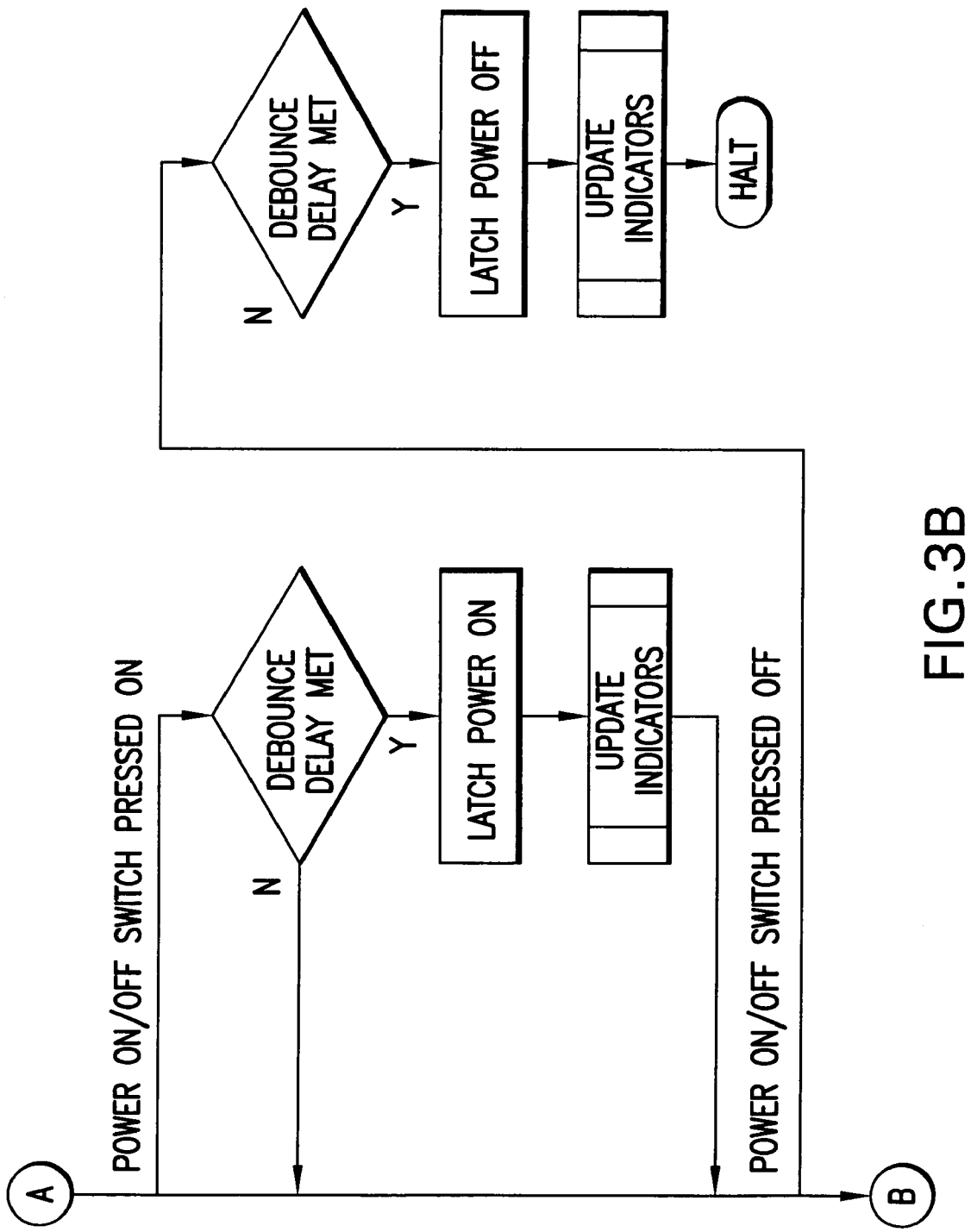
Figure 3C:
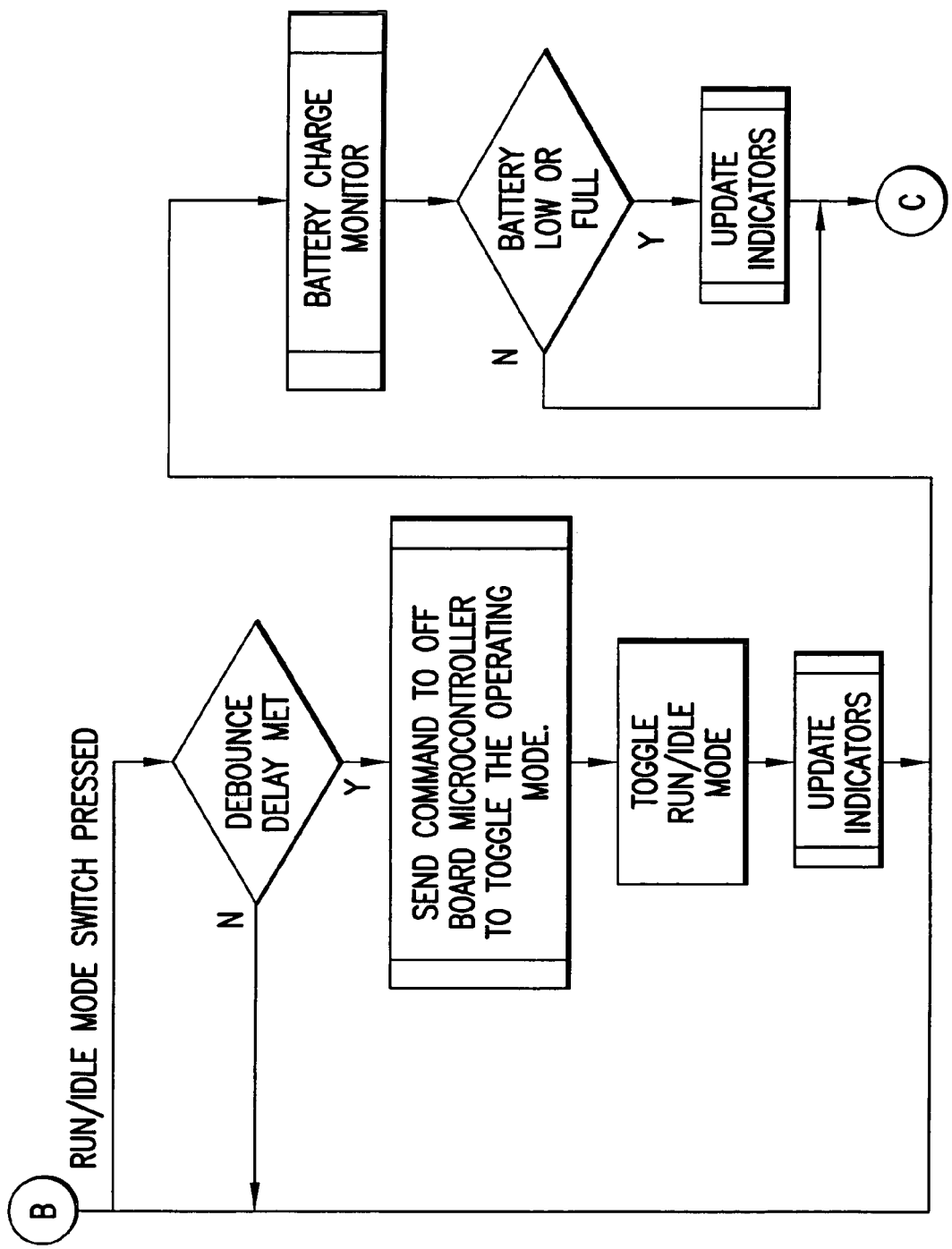

FIG. 2B shows functional units that may be included in the PCCB. These include, but are not limited to, a battery charger 292, a battery monitoring unit 285, DC/DC converters 294, switch latches 296, LED drivers 298, and a piezo alarm 290. A microcontroller/microcomputer 287 included in the PCCB may run using software or firmware that interprets operating conditions from the battery monitoring unit 285, DC/DC converters 294, an off-board input from power ON/OFF and Run/Idle switches, as well as from the microcontroller 250 shown in FIG. 2A. The program code in the microcontroller 230 shown in FIG. 2B processes and interprets operating conditions to turn the power on or off, to change operating modes, and to display these operating conditions as well as any errors or warnings on the exemplary LED displays. Details of the processes performed by the microcontroller 230 are shown in detail in FIGS. 3A–3C.

The worker unit may be constructed to be small and light so as to be portable. For example, the worker unit may have dimensions of 6.3"×4.1"×2.1" and weigh 1 lb., 15 oz. The worker unit may be connected by cables to the GPS antenna 215 and the telemetry antenna 225. Both the GPS antenna and the telemetry antenna may be mounted on a hard hat that is worn by the user. Since the worker unit is worn close to the body and it is possible for the human body to block some of the signals, the antennas may be mounted at the highest point possible; in this case, the top of the head.

Figure 4A:
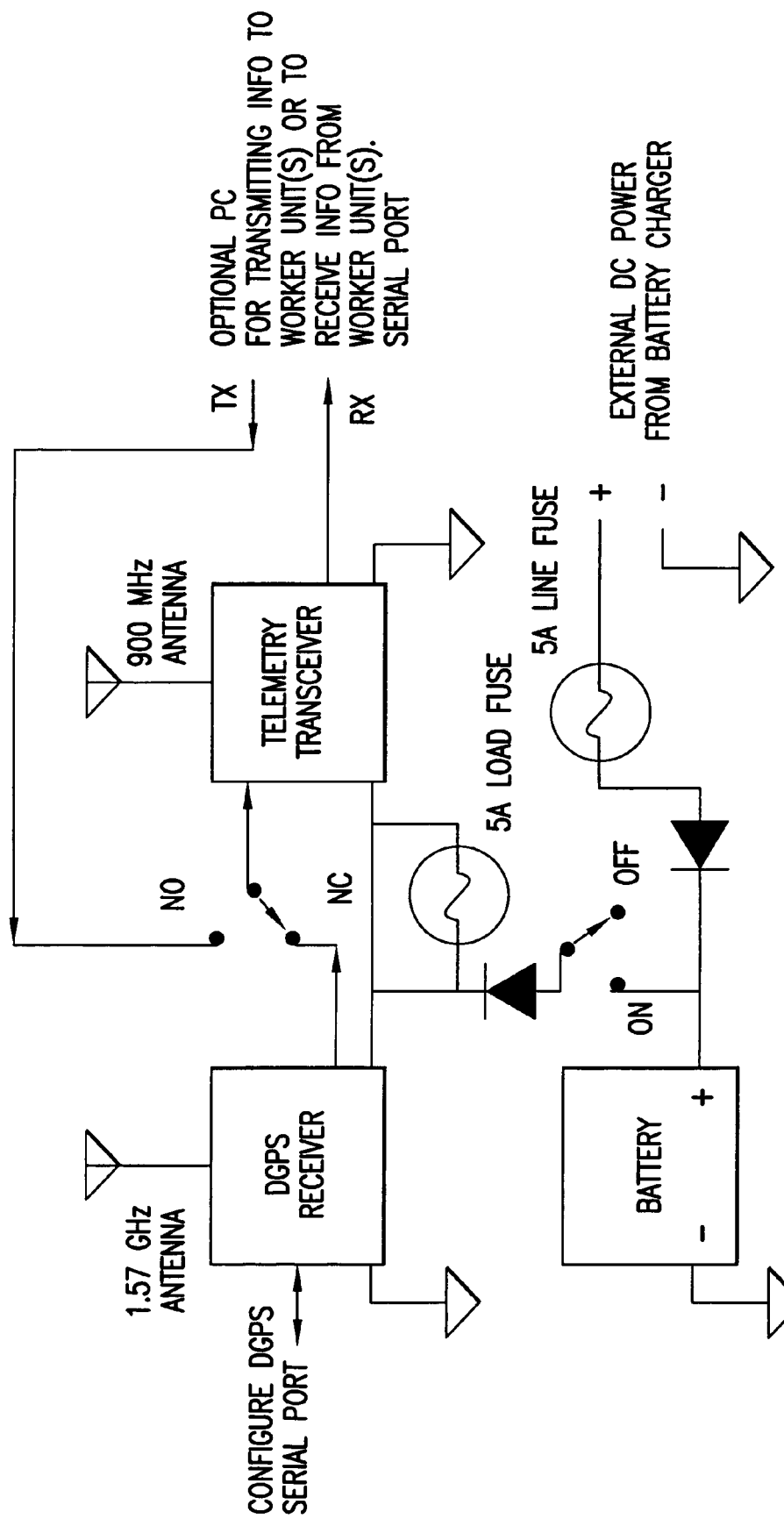
FIG. 4A illustrates in detail an exemplary reference unit.
Figure 4B:
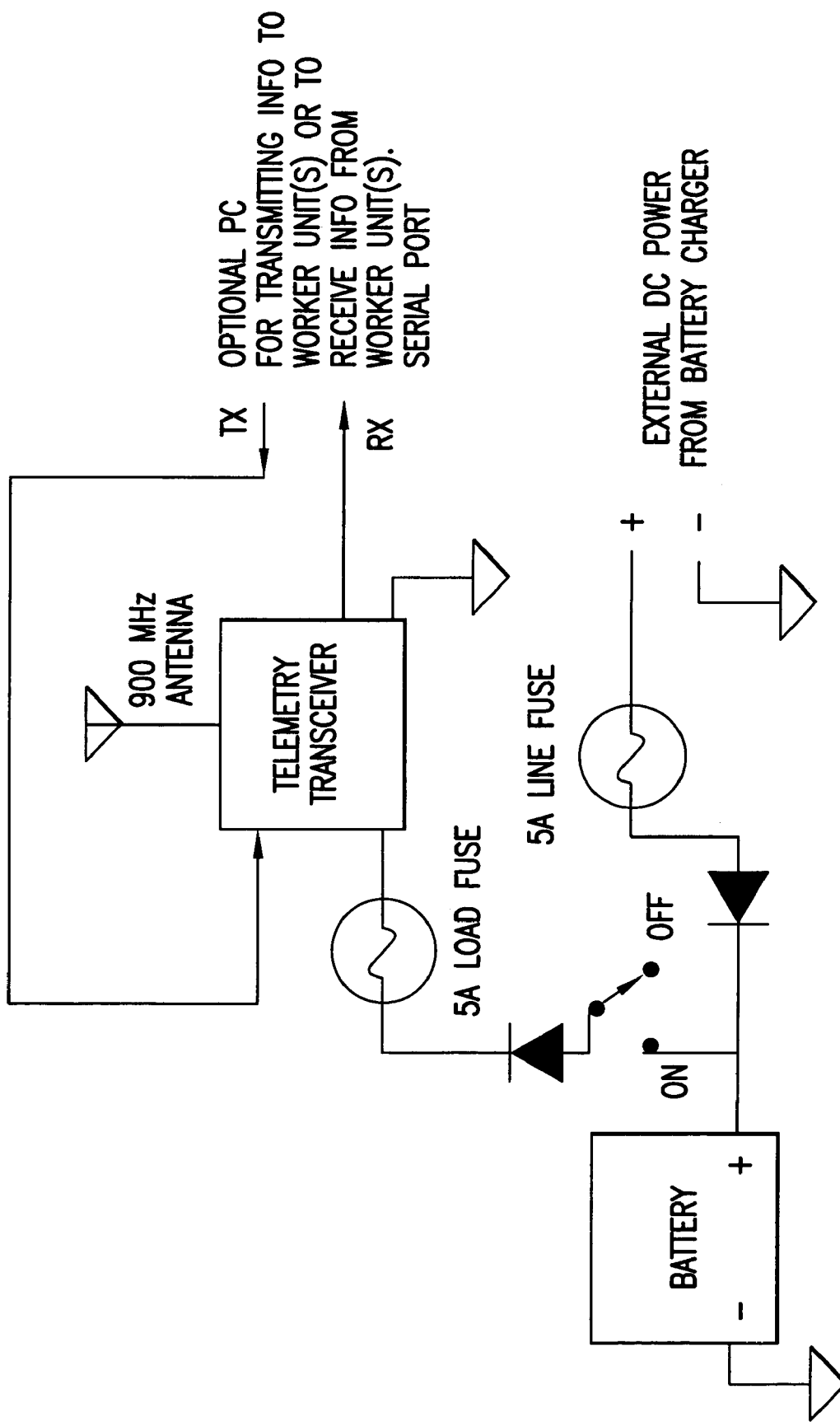
FIG. 4B illustrates in detail an exemplary repeater unit.

FIG. 4A illustrates an exemplary reference unit in detail. FIG. 4B illustrates an exemplary repeater unit in detail.

DGPS corrected positions are within 1–2 meters (at two sigma) with reasonably clear sky view at the user locations. As shown in FIG. 4A, corrections data received from a satellite at a DGPS receiver is relayed via a telemetry transceiver to worker units in the vicinity. The corrections data may be relayed via one or more repeaters, which, as shown in FIG. 4B, also include telemetry transceivers for this purpose.

According to exemplary embodiments, there may be two implementations of the reference units, a stationary version and a portable version. Either or both of these may be used to improve the position accuracy over stand alone worker unit operation.

According to an exemplary embodiment, the stationary reference unit or "rooftop unit" is a large, rugged unit with a solar panel, capable of long-term operation in a fixed location. It may be used with either one or two internally housed 100 ampere-hours deep charge sealed lead acid batteries that are recharged by a 75 watt solar panel and an internal charge controller. All electronics, except the solar panel and the telemetry and DGPS corrections antennas, may be housed in a weather resistant, lockable, aluminum enclosure. The solar panel and antennas may be mounted to separate (short) masts that affix to the enclosure. The unit may be positioned in a secure area with reasonably clear sky view. Adjustments can be made to orient the solar panel for optimal inclination. Once turned on, this unit may remain outdoors for extended use without supervision.

In the stationary reference unit, the GPS receiver may be implemented with, e.g., Ashtech G8 GPS OEM PCB GPS receiver that informs the DGPS corrections receiver of the geographic region for which corrections data is needed. The DGPS transceiver may be implemented with, e.g., a Thales (formerly Racal) Landstar OEM differential GPS corrections receiver. According to this embodiment, the differential corrections are received from a satellite in geostationary orbit. The corrections are fed directly to the telemetry transceiver.

A portable reference unit may be used for shorter term research studies. It may be operated either from its internal 7 ampere-hour sealed lead acid battery for up to four hours, from two such batteries for up to eight hours, or for longer durations from an external 12~13.8 VDC power source, such as from a vehicle cigarette lighter socket. When connected to an external 12–13.8 VDC power source, the internal battery will recharge from the external supply whether the unit is running or turned off.

All electronics, except the antennas, may be housed in a weather resistant, lockable, suitcase sized enclosure. The telemetry and DGPS corrections antenna both have magnetic mount bases to allow them to be placed on top of a vehicle. The reference unit would then be kept inside the vehicle with cables exiting the top of a window to the antennas. The vehicle may be positioned in a secure area with reasonably clear sky view.

If personnel wearing the worker units traverse a great distance, the vehicle may be driven to a closer location to increase received signal strength and data link integrity. Once turned on, this unit will operate without supervision. As an alternative, one or more repeater units may be used to extend the distance over which the reference unit signals may be received by the worker unit(s).

The portable reference unit may use a Thales (formerly Racal) Landstar Mk IV Type 90952/3/1-SK8 DGPS corrections receiver which has a GPS receiver integrated into the unit.

According to an exemplary embodiment, the worker unit may be configured using an interface program and accompanying DLL copied to a standard personal computer or laptop with an available serial port. Once the interface program is activated, the worker unit may be configured using a screen, such as that shown in FIG. 5A.

In FIG. 5A, the interface screen is divided into three sections labeled Sensor Port Assignment, Data Logging Interval, and LPS Data Received.

The Sensor Port Assignment section allows the user to both view the current sensor port assignment for a particular worker unit and to reassign the sensor ports on a worker unit.

As shown in FIG. 5B, each port window has a drop-down window that is accessed by a down arrow button. The drop-down window displays all of the sensors currently usable with the LPS system.

Referring again to FIG. 5A, the Data Logging Interval section allows the user to both view the current data logging interval for a particular worker unit and to select a different data logging interval for a worker unit. According to an exemplary embodiment, the numeric value can be between 1 and 999, inclusively. The user can select hours, minutes, or seconds. This allows a wide range of logging intervals from as rapidly as once per second to as long as once every 999 hours.

The lower portion of this section has two windows that can display the ID of the worker unit attached to the computer and the time zone setting so that the worker unit can adjust its clock to the locale where data is being collected. Both of these parameters can be retrieved from the worker unit and reset on the worker unit.

The LPS Data Received section displayed real-time data received from the LPS Worker unit. When commanded, the worker unit will transmit current sensor and position information for up to five minutes unless commanded to stop. The data received will be displayed in these windows. The data is received at the same rate as the data logging interval.

As shown in FIG. 5C, there are four commands available under the "File" menu. These commands: load configuration file, save configuration file, reset interface, and exit. The load configuration file command opens a standard Windows open file dialog box. From here, the user can select a previously saved LPS worker unit configuration file. When loaded, the program will set the "Sensor Port Assignment" and "Data Logging Interval" portion of the interface. The save configuration file command opens a standard Windows save file dialog box. From here, the user can save a LPS worker unit configuration file. The information saved will be the settings in the "Sensor Port Assignment" and the "Data Logging Interval" portions of the interface at the time the file is saved. The reset interface command is used when the user changes worker units or just needs to clear all of the settings. It resets the interface program to its default state; all information about the previous settings is lost. The exit commands allow the program to be closed and exited.

Figure 5D:
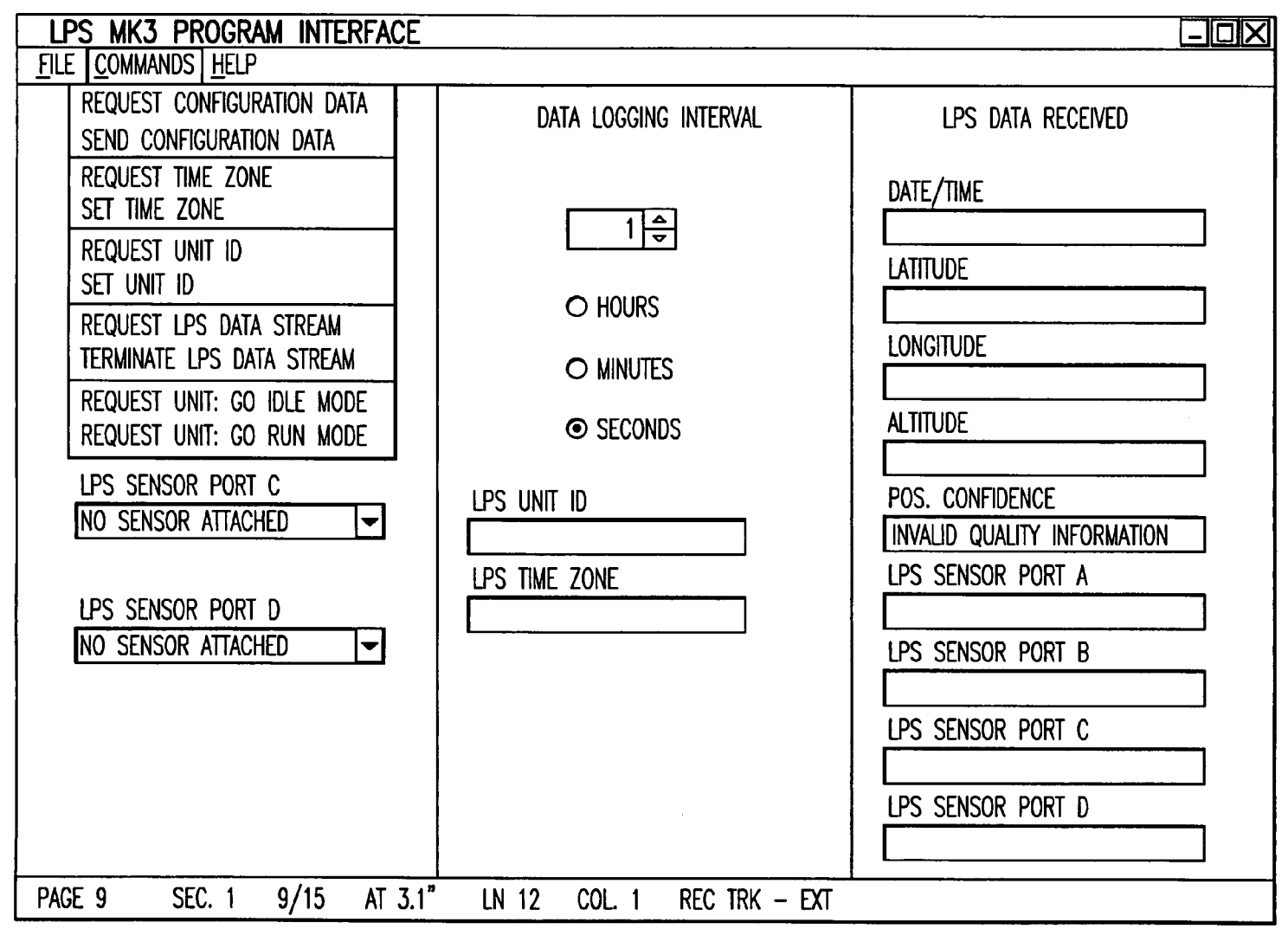

As shown in FIG. 5D, there are ten commands under the Commands menu. The first time that information is requested from or sent to the LPS worker unit, a small dialog box will appear asking the user to select the serial port that is being used to communicate with the worker unit.

The request configuration data command requests the current configuration settings from the LPS worker unit. The configuration settings consist of the sensor port assignments and the data logging interval.

The second configuration data command sends the configuration settings currently set on the interface program screen to the LPS worker unit. The configuration settings consist of the sensor port assignments and the data logging interval.

The request time zone command requests the time zone selection being used by the worker unit. The response is displayed in the window labeled "LPS Time Zone."

The set time zone command generates a dialog box that allows the user to select any of the four time zones used within the continental United States. Once selected and the user presses the "OK" button, the new time zone selection is sent to the worker unit. The worker unit resets its internal clock in accordance with the new time zone and saves the new setting.

The request unit ID command requests the unit ID of the worker unit. The response is displayed in the window labeled "LPS Unit ID."

The set unit ID command is password protected to prevent accidental or casual changing of unit ID numbers. In order to proceed, the user must enter the password. The system then generates a dialog box that allows the user to change the worker unit ID. Once the user presses the "OK" button, the new ID is sent to the worker unit and stored in non-volatile memory.

The request LPS data stream command requests the worker unit to send data to the interface program. The data is processed and displayed in the various windows in the "LPS Data Received" section. The data is transmitted for five minutes and then automatically terminated. The data is transmitted at the same rate as the data logging interval.

The terminate LPS data stream command tells the worker unit to cease sending the data stream.

The request unit to go to IDLE mode command tells the worker unit to enter IDLE mode. Switching to IDLE mode causes the worker unit to cease data logging functions and to close all open data files.

The request unit to go to RUN mode command tells the worker unit to enter RUN mode. When in RUN mode, the unit processes GPS and sensor information and logs the data to the flash card at the specified logging interval.

According to an exemplary embodiment, the LPS worker unit generates a unique file name whenever it starts to log data. The file name may include a date sequence (in yymmdd format), followed by a lower case 'a'–'z' to indicate the run sequence for that day. All data log file names may be given the ".txt" file extension.

For example, the file name "030410a.txt" indicates the first data log file (as indicated by the letter 'a') created on Apr. 10, 2003. The second data log file for that day would be named "030410b.txt".

A backup log file may be created along with the original log. The backup log may have the same name as the original log, but with a 'b' appended to the file name. For the example given above, the backup log file name is "030410ab.txt". New data may be added to the backup log file every sixty log entries. If the system is logging data once every second, then the backup log may be appended once every minute. Similarly, if the LPS logs data once every minute, then the backup log may be appended once every hour. Therefore, the backup log would be no more than sixty entries shorter than the main log file.

According to exemplary embodiments, GPS and corrections data may be collected by the worker unit in Department of Defense World Geodelic System (WGS84) format or Local Reference Coordinate (LRC) format.

According to an exemplary embodiment, the first line of any data log file will contain format specifications. These specifications may appear as follows:

WGS84—$DT,TM,LT,LG,Ax,PC,su1,su2,su3,su4,ID,x#

LRC—$DT,TM,Xx,Yx.Ax,su1,su2,su3,su4,ID,x # where

'$' is a delimiter indicating start of a new sentence.

',' is a delimiter separating data fields.

'#' is a delimiter indicating end of a sentence.

Ax is a string indicating this field contains altitude information.
  Af is altitude given in feet
  Am is altitude given in meters DT is a literal string indicating this field contains date information, e.g., in YY/MM/DD format.

TM is a literal string indicating this field contains time information, e.g., in HH:MM:SS format.

LG is a literal string indicating this field contains longitude information, e.g., in DDD:MM:SS.SSS (Degrees (DD), minutes (MM) and seconds (SS.SSS)) format.

LT is a literal string indicating this field contains latitude information, e.g., in DD: MM: SS.SSS (Degrees (DD), minutes (MM) and seconds (SS.SSS)) format.

PC is a literal string indicating this field contains position confidence information represented in the format, e.g., "aaa".

Xx is a string indicating this field contains local reference x-coordinate data.
  Xf is the X-coordinate data given in feet.
  Xm is the X-coordinate data given in meters.

Yx is a string indicating this field contains local reference y-coordinate data.
  Yf is a Y-coordinate data given in feet.
  Ym is a Y-coordinate data given in meters.

su1, su2, su3, and su4 are fields indicating the units associated for sensors 1, 2, 3, and 4, respectively.

According to an exemplary embodiment, sensor unit specifiers may be given as follows:
  "*" No sensor selected for that data input channel
  "Du" Dust concentration measurements given in ug/cm3
  "GO" Gas level —$O_2$ in %
  "GC" Gas level —$CO_2$ in %
  "Gc" Gas level —CO in ppm
  "GL" Gas level —LEL (lethal explosive gas) in ppm "GS" Gas level—SO$_4$ in ppm
"Gs" Gas level —H$_2$S in ppm
"Hr" Humidity—relative in %
"La" Sound pressure level measurements (Lavg) given in dB
"Lm" Sound pressure level measurements (Lmax) given in dB
"Tc" Temperature measurements given in degrees C.

****

ID is a literal string indicating following field contains unit identification information.

x is a worker unit identification number.

****

As an example, consider the specifier:

$DT,TM,LT,LG,AfPC,Tc,Du,La,Lm,GO,Gc,GL,Gs,ID,1#

This specifier indicates WGS-84 reference frame by using the LT and LG indicators. It also indicates that the altitude is given in feet. Sensor #1 information is temperature in degrees C., while sensor #2 information is dust concentration in ug/cm3. For the Phase III unit, sensor #3 includes sound pressure information from a Sound Level Meter and sensor #4 includes gas level readings from a four-gas monitor. The ID indicates that this is worker unit #1.

Without differential correction (unaided), the accuracy range is 15–100 meters. Using the differential mode, the accuracy can be increased to 0.5–5 meters. A GPS receiver with access to four satellites can measure latitude, longitude and altitude and this setting is called as a three-dimensional fix. A two dimensional fix (latitude and longitude) is maintained when the receiver has access to three satellites.

According to an exemplary embodiment, the position confidence information represented by fixed 3 characters may assume one of the following values.

2DD—Two dimensional differentially corrected position fix.
  2DU—Two dimensional unaided position fix.
  3DD—Three dimensional differentially corrected position fix.
  53DU—Three dimensional unaided position fix.
  CDR—Canadian Marconi (CMC) dead reckoning fix.
  NVC—No valid fix.
  PPS—Precise position system fix (military grade).
  SPD—Differentially corrected SPS fix (civilian grade).
  SPS—Unaided standard position fix (civilian grade).
  LINK—unknown fix quality.

The number of data fields in the sentence may vary, depending on the number of data elements provided by the various sensors. For example, some sensors, such as the sound level meter and the four-gas monitor, may provide multiple data elements. The data sentence should match the format specifier header with regards to the number of fields present. Also, if no valid data is present, then an asterisk ('*') may appear in any field.

An example data log file ("020503a.txt") is shown below:

$DT,TM,LT,LG,Af,PC,La,Lm,Du,*,*,ID,1#

$02/05/03,13:04:52,N39:39:19.366,WO79:57:15.022, 1197.5,3DU,59.1,60.2,742.0,*,*#

$02/05/03,13:04:52,N39:39:19.366,WO79:57:15.022, 1197.5,3DU,59.1,60.2,742.0,*,*#

$02/05/03,13:04:53,N39:39:19.365,WO79:57:15.022, 1197.8,3DU,58.0,58.7,742.0,*,*#

$02/05/03,13:04:54,N39:39:19.363,WO79:57:15.022, 1197.8,3DU,57.2,58.3,742.0,*,*#

$02/05/03,13:04:55,N39:39:19.362,WO79:57:15.021, 1198.1,3DU,57.8,58.4,742.0,*,*#

$02/05/03,13:04:56,N39:39:19.360,WO79:57:15.021, 1198.1,3DU,57.7,58.4,743.0,*,*#

$02/05/03,13:04:57,N39:39:19.359,WO79:57:15.021, 1198.5,3DU,59.0,59.8,742.0,*,*#

In this example, we see that it is a WGS-84 reference specification with altitude in feet, position confidence information, two sound pressure level measurements, and one dust concentration measurement. The other two sensor ports are unused, and this data was collected using worker unit #1. From the position confidence field, we see that it is an unaided three-dimensional GPS fix. We can tell by the file name that this was the first log file created on May 3, 2002.

The LPS worker unit logs data measured by an on-board geographical positioning system along with real-time sensors for parameters such as dust, temperature, sound and gas. By attaching this device to a mobile worker, the exposure monitoring system will be able to log the data related to all the attached sensors and can later be used by researchers to analyze and determine hotspots related to that work place. Studying the exposure patterns will in turn be helpful to regulatory inspectors, researchers and the industry to take necessary precautionary steps and improve the health and safety of personnel.

The LPS worker unit records several pieces of data at regular intervals. Data recorded includes the time, the position of the LPS, and the current value measures by each of one or more sensors. Analysis of these data may be used to determine the distribution of sensor values during the measurement period, determines the LPS's position during the measurement period, determine sensor values over time, and locate "hot spots". The ability to "filter" the data allows the analysis to focus on those data of most interest. Summarizing and graphing the data in different ways can be helpful in accomplishing different purposes.

According to an exemplary embodiment, a user-friendly software tool may be loaded into a computer that receives the collected and correlated data to filter, analyze and visualize the data. Given the volume of the data involved, the software has a fast processing time to create and recreate filtered data for analysis. Since data related to geographic location is involved, the software is compatible to the GPS standards and should be able to map geographical location information.

According to an exemplary embodiment, the analyzer 200 shown in FIG. 1 may include a statistical analysis software module or geographical information system module to perform data retrieval, data management, report generation, and statistical and mathematical analysis of the data collected by the LPS worker units 100. The data collected from various sensors may be logged into text files. The text files serve as input to the application.

According to an exemplary embodiment, statistical management software tools, such as the statistical analysis software module SAS®, developed by SAS (Cary, N.C.), may be used. The data management tools may be used to convert the textfiles to a SAS® dataset. The datasets may be used to facilitate analysis and represent the data graphically. The user will then be able to filter the data and save the data of interest and generate reports.

The software module may be built on the Model-View-Controller (MVC) architecture and implemented by primarily two tools of the SAS® application development environment: SAS/AF (SAS Application Framework) and SCL (SAS Component Language).

It will be appreciated that other software modules may be used for analyzing collected and correlated data. For example, Microsoft solutions, such as Visual Basic and VC++, can also be used for analysis, although the processing speed may be very slow given the amount of processing involved. Both Visual Basic and VC++ do not come with appropriate tools for efficient data display mechanisms. Another choice is Java, for which there are two ways to display data, Java Server Pages (JSP) and Java Applets. However, java applets may be slow to load and may require a separate database to store and access the data.

Also, a variety of geographic information system (GIS) software tools may be used to analyze the collected and correlated data.

According to an exemplary embodiment, the SAS® programming language may be combined with SAS® graphical display tools to provide an alternative to geographic information system, Microsoft Visual Development Studio and Java technologies. According to an exemplary embodiment, a recent SAS® version, SAS 8, may be used.

FIG. 6 illustrates exemplary architecture of SAS® software for use as a data analysis tool. Part I of the figure indicates that the raw text file is input for the application, and the data is converted to a SAS® dataset in the user requested SAS® library. Part II indicates that the SAS® dataset is input for the rest of the application to analyze the data and represent the analysis results in the form of graphs and plots. The user interface of the application allows the user to parse and filter the dataset to create subsets of the data and to make the subset as an input to the application for further analysis and storage.

The nucleus of SAS® is Base SAS software. Base SAS is a combination of procedures and a data management tool that is used for four data driven tasks and application development. All the data management and data manipulation related programs in the application use Base SAS.

Data in any format like spreadsheets, comma delimited files, raw text files, database tables and spatial data can be accessed and used for analysis. Data access and data conversion is achieved using Base SAS programs in the application. Once the data is converted into the SAS® dataset format, it can be manipulated.

Base SAS provides various data analysis tools to summarize the data and also to perform all kinds of statistical analysis methods like descriptive statistics, correlation and ANOVA (Analysis of Variance), just to name a few. Most of the analysis is done by the SAS® programming language and results can be displayed graphically.

The application attains graphical representation of the data by SAS/AF Frames and SAS/Graph. SAS/Graph is another component in SAS® that provides high resolution color graphics to produce charts, maps and plots. Graphic output can be stored as an object for future retrieval and display. Images are compressed into various formats like GIF, TIFF and BMP. SAS Risk Management and SAS Supplier Relationship Management tools can extend SAS analytical capabilities.

SAS® provides a means to present data in customized reports using SAS data steps and using report and tabulate procedures. The procedures provide a mechanism to create tabular reports and classify the variables and identify relationships between variables. The generation of the reports in the application is made using Output Delivery System (ODS) architecture, which is depicted in FIG. 7.

ODS allows output to be presented in much useful fashion with more display control, especially for web applications and publishing. It also allows management of program output by creating output objects from the procedures. Referring to FIG. 7, the output objects have three components: data component, table definition, and an output destination.

The data component is similar to SAS® dataset and stores results of the output in table format. The table definition contains a description about the data component. The information includes order of the columns and column headers, formats for data. The output object contains the procedure results and also information about how to present the results.

Figure 7:
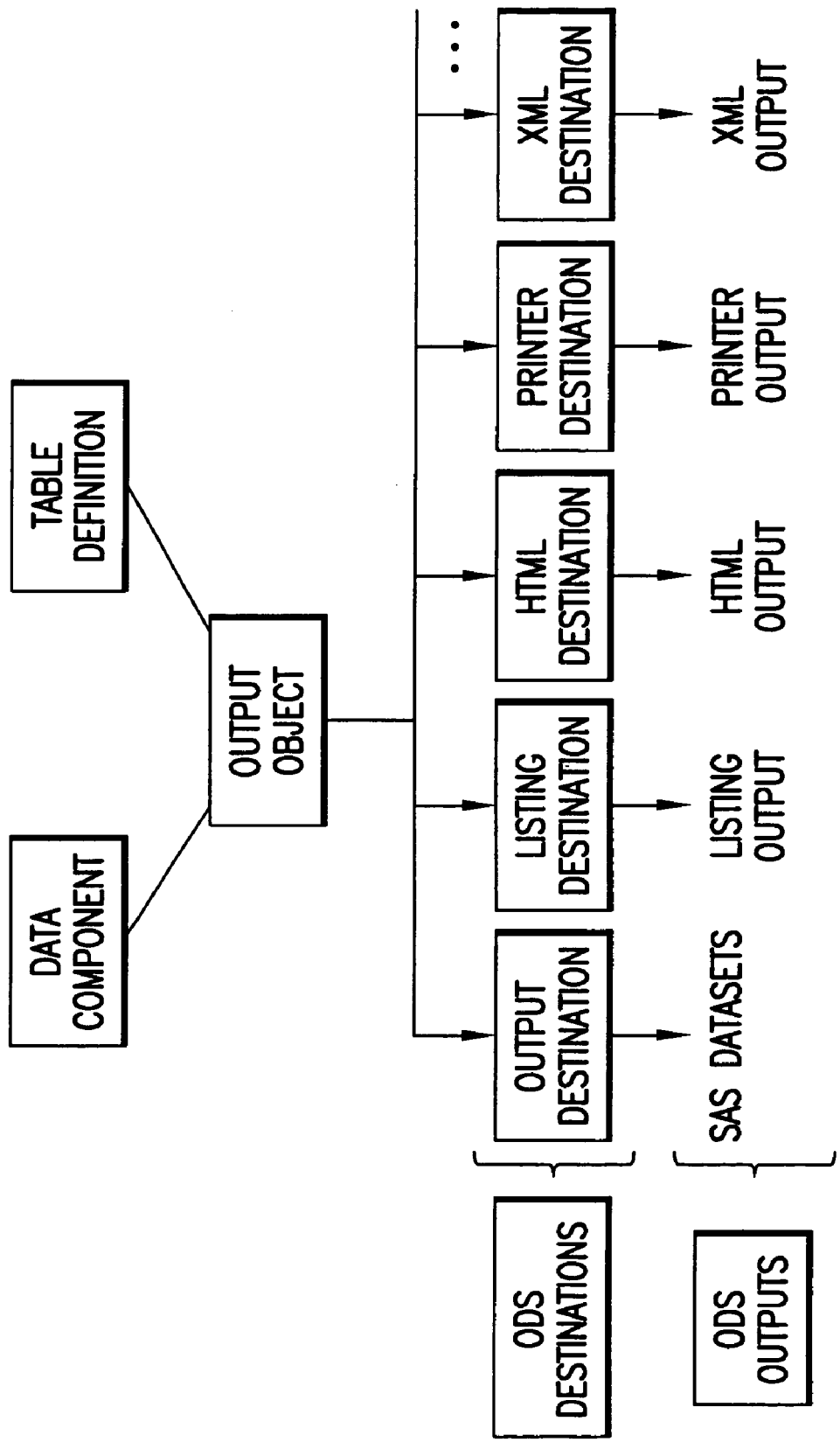
FIG. 7 illustrates exemplary output delivery system (ODS) architecture.

As depicted in FIG. 7, ODS basically binds the table definition to the data component to produce an output object.

All the procedures are associated with some output destination. For example, Proc Univariate (all the procedures in SAS® are shortly called as Proc and Proc is also a key word in SAS® programming language to represent procedure) creates the results in five output destinations Moments, Basic measures, Tests for location, Quantiles, Extreme OBS. An object is created for each of the destinations, and the created output objects can then be sent to one or more of ODS outputs depending upon the user's requirement in the SAS® program.

The application uses the ODS facility to generate reports. For example, the application uses Basic Measures (contains mean, standard deviation, etc.) and Quantiles (contains percentiles of the data) output destinations of the Proc Univariate and assigns it to an HTML or RTF (rich text format) output. The output object is formatted according to its content and the destination.

SAS® offers two application development solutions: SAS/AS (Enterprise Information System) and SAS/AF (Application Framework). SAS/AS is a rapid application development drop environment to develop point and click applications. SAS/AF provides an object oriented, interactive application development environment that can be used to develop powerful customized enterprise-wide applications. It provides a visual frame-based development tool and the built in functionality of the Frames can be extended using SCL (Screen Control Language).

SAS® offers a very good application development platform, SAS/AF (Application Framework), to develop interactive windows based applications. SAS/AF provides tools to develop customized and interactive applications. Porting applications from one platform to another platform can be done with little modifications. Developing point-and-click applications lets developers create applications harnessing the SAS capabilities and hiding the implementation details from the end user. SAS/AF in SAS 8 version provides a modular and object oriented programming environment. The application uses SAS/AF functionality to generate frames for graphical user interface development. The Base SAS language programs are embedded in the SCL code of the application to accomplish the data manipulation and data management tasks. The frames include basic GUI (Graphical User Interface) framework and SCL code that frame performs the actions requested by the user. For example, frames can have buttons but the action performed when a button is clicked is done by the SCL code associated with that button. SCL code is to be written by the programmer.

SAS® has a programming language that is used to manage the data and a debugger that is used to debug the programs. DATA step and procedure (PROC) step are the two basic blocks of any SAS® program. They can be used alone or combined in a SAS® program. The DATA step is mainly used to access and manipulate the data, and the PROC step is used to perform analysis on the data.

Figure 8:
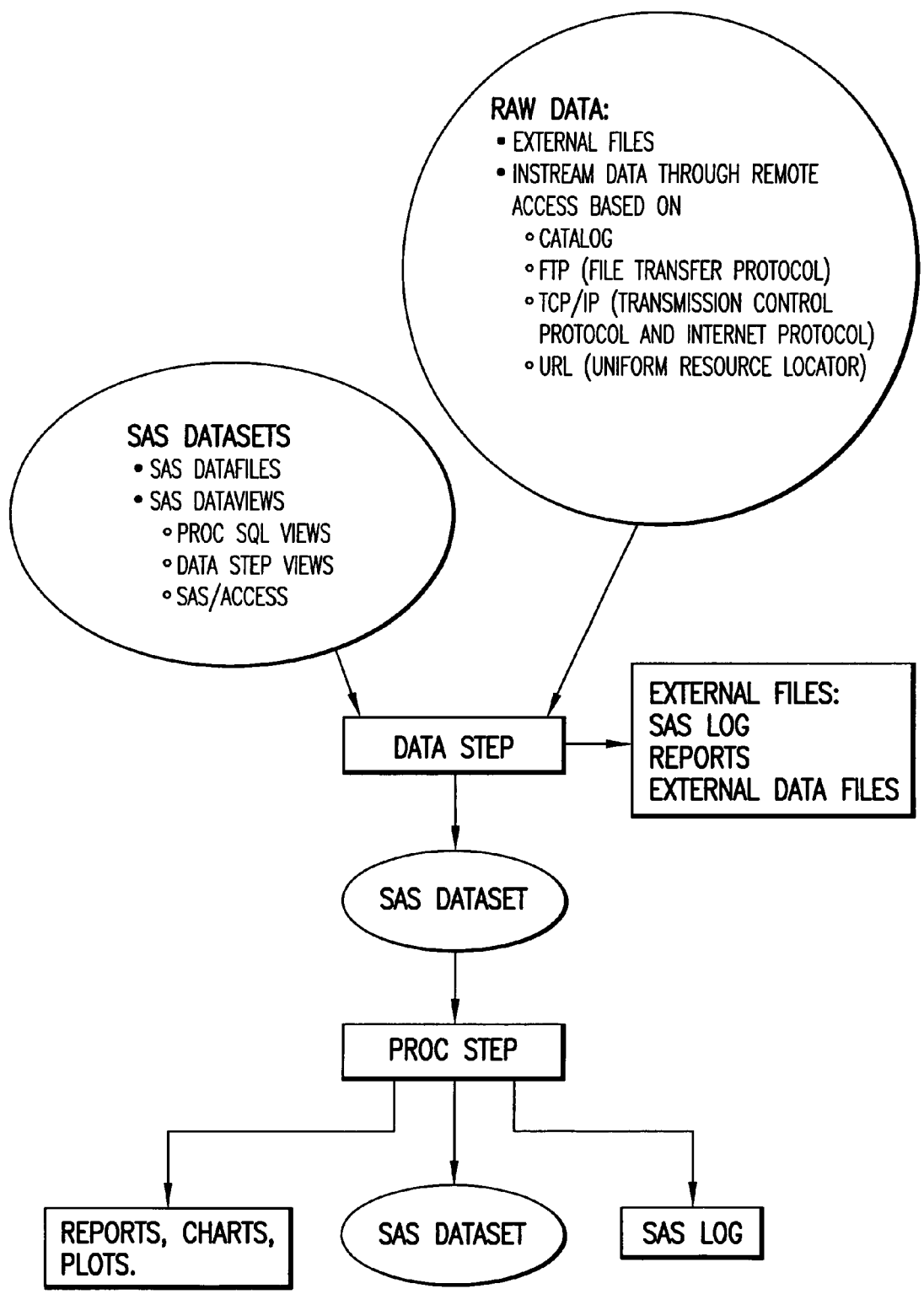
FIG. 8 illustrates exemplary steps involved in SAS processing.

FIG. 8 illustrates exemplary SAS processing. The data sources for the DATA step can be SAS® datasets, data views or external raw data files. SAS® maintains a log of generated messages and errors regarding the program and is helpful while debugging.

SAS Macro is also a part of SAS® programming language. Using SAS macros decreases the length of the code and increases the readability of the program.

SAS® has its own way of representing data in the form of datasets, data views, data libraries, catalogs.

The SAS® library is the logical equivalent of a windows directory. The library acts as a repository for various SAS® files that can be further referenced and stored as a unit. The storage mechanism is analogous to the way an operating system accesses the files in a directory.

SAS® datasets are equivalent to tables in relational databases. Each dataset contains two parts: a data portion a descriptor portion. The data portion contains rows and columns called as observations and variables respectively. As described above, the datasets created in the LPS application follow WGS84 or LDC data representation specifications. A descriptor portion contains information about the dataset (number of variables, dataset name, number of observation, date created, and date modified etc.) and variable (name of the variable, variable type indicating if it is Char or Num, variable position indicating the column number etc.).

An SAS® dataset may also have an auxiliary file called an index file. The index provides fast access to observations within a SASS data file through a variable or key. Even though indexes are stored as separate files SAS System treats them as integral parts of the SAS data file.

SAS® catalog is a SAS® file that is part of a library and stores smaller units called entries. A frame is a basic component of a GUI in SAS application and various other components are added to the frame to build complete interface. All the frames and the entries associated with the frame are stored in catalogs. SAS catalogs add another layer in data management ability separating the files in the library from the files related to graphical user interface.

SAS® macro facility is a tool that comes with the Base SAS software. Macros increase the program development efficient and effective. They decrease the development time and also lets the programmer to modularize the SAS® programs. SAS® macro facility is included with SAS® by default, and almost all products use SAS® macros internally. The syntax of macro language is similar but little different to SAS language. Macros are used to communicate between the frames.

Basically, the SAS® macro facility is a tool for text replacement where in a text is associated with macro reference. The text could be a simple string or SASO program statements.

The functionality of the software may be divided into three different subjects: graphical user interface developed using SAS/AF; data storage in SAS® dataset format; and project environment for maintaining the application and data.

Figure 9:
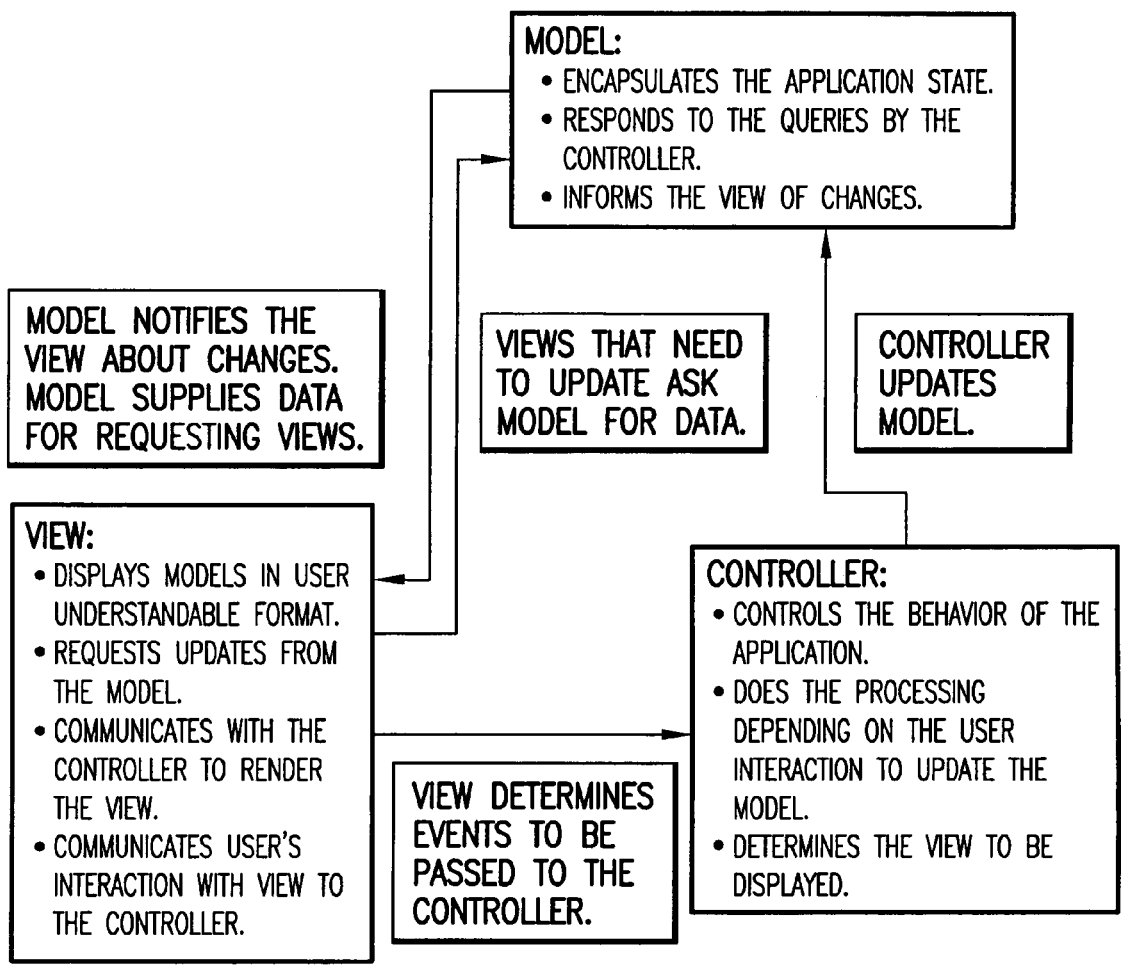
FIG. 9 illustrates an exemplary model-view-controller architecture.

The application follows the Model-View-Controller (MVC) architecture depicted in FIG. 9. The MVC architecture separates the application object (data) from the way it is presented to the user (view) and also from the way user controls it (control). Data is stored in the model. The Controller handles the input while the view takes care of the output. The Controller does data processing and manipulation.

The model is implemented using datasets. The raw data is converted to SAS® datasets and is stored in the dataset format.

The model part of the application is implemented using SAS® datasets. The raw data in comma delimited text format is converted to a WSG-84 compliant dataset.

The frame is implemented using SAS/AF frame technology. Frame technology is used to develop the graphical user interface. Frames provide user interface for the SAS/AF application. The development environment of SAS/AF enables programmer to create windows looking frames and to add ready made objects (components) to the frame. A frame is an instantiation of the Frame class and is stored in a SAS catalog entry of type Frame.

The controller is implemented using SCL (SAS component language). SCL is used to communicate between model and views.

The raw text file is converted to SAS® dataset using the SAS Data and Input step. The original data is preserved in an original dataset with each element of the above data sentence treated as an attribute (column). A summary dataset is also created using means procedure, which contains the descriptive statistics for each sensor. A means procedure in SAS® provides tools to compute descriptive statistics for variables across all observations and within groups of observations. The original dataset and summary dataset are stored in user specified library. Apart from the above two datasets, some temporary datasets are created in work library. The temporary datasets are created to store information about longitude and latitude data converted to meters and also to store filtered dataset when user filters data using various filtering mechanisms. The temporary datasets created do not provide an overhead on the system as the data is deleted by SAS® when the session is ended.

Referring once again to the MVC architecture shown in FIG. 9, the Controller has all the logic to manipulate data. The controller handles user interactions with the frames and frame's components. The controller part is implemented using SCL (SAS component language). SCL is an object-oriented language designed to facilitate the development of interactive SAS® application. SCL code is written for each frame to handle the generated events. Each user interaction is an event.

SCL code for data input and analyzes frames validates user input. For example, the SCL codes checks that the user registers only the known sensors, checks if the user selected a non-existing library, and checks if the library name is more than the prescribed length, e.g., 8 characters length.

The SCL code also creates SAS® datasets. This includes creating the original dataset, crating the statistics summary dataset, and creating temporary datasets required for analysis.

The SCL code is also used to link to other catalog entries. For example, the analysis frame is linked to the data input frame and is invoked by using SCL.

The SCL codes also change the attribute values of components on a frame at runtime. For example, the number of buttons and filters displayed in the analysis frame are determined at runtime. Also, the datasets to be displayed by the histogram and location plot are updated depending on the sensor button pressed and also by the filtering mechanism.

The SCL code is also used to invoke methods of components on a frame. Various predefined methods of components are called with in SCL programs.

The SCL code is also used to submit SAS programs. For example, SAS programs to access data are wrapped with in SCL code between submit—endsubmit blocks. This allows accessing base SAS® capabilities from SCL.

Another function of the SCL code is to define custom behavior for components. Code is defined for all components in labeled sections. Whenever a user interacts with the component associated code is executed for that component.

According to exemplary embodiments, various SAS® procedures may be used to compute descriptive statistics, quantiles, and frequency counts and to plot maps and graphs based on the datasets. The application mainly harnesses the power of SAS® procedures by summarizing the data via a graphical display to provide insight about the data collected. Exemplary statistics that may be calculated include mean, variance, maximum and minimum, histograms, box plots, and quantiles.

As part of the mean calculation, the mean for each sensor data is calculated. The mean or expected value of a random variable X describes where the probability distribution is centered. The means procedure computes descriptive statistics for numeric variables across all observations of a dataset (one report per dataset) and within groups of observations (one report per group). Using means procedure, descriptive statistics can be calculated based on moments. In addition, quantiles, including the median, can be estimated, confidence limits for the mean can be calculated, extreme values can be identified, and a test can be performed.

Variance calculates the variability in the distribution as mean by itself does not give adequate description of the distribution. When data points are closer to mean, the variance is small but when the values are scattered, the variance is large.

The univariate procedure provides data summarization tools, high-resolution graphics displays, and information on the distribution of numeric variables. Unlike means procedure, univariate procedure can plot the distribution of the data and test for the normality of the data. The univariate procedure can be used to calculate descriptive statistics based on moments, calculate the median, mode, range, and quantiles, calculate the robust estimates of location and scale, calculate confidence limits, tabulate extreme observations and extreme values, generate frequency tables, plot the data distribution, perform tests for location and normality, perform goodness-of-fit tests for fitted parametric and nonparametric distributions, create histograms and optionally superimposes density curves for fitted continuous distributions and for kernel density estimates, create quantile—quantile plots and probability plots for various theoretical distributions, create one-way and two-way comparative histograms, comparative quantile—quantile plots, and comparative probability plots, inset tables of statistics in the graphical displays (high-resolution graphs) create output data sets with requested parameters of the fitted distributions.

Maximum and minimum values may also be calculated.

Histograms are bar charts and are used to show the distribution of the data. The observations are divided into equal sized intervals and the number of observations that fall into that interval is represented by the histogram bar height. The height of each histogram bar is proportional to the number of observations in that interval.

Box plot encloses the interquartile range of the data in a box. The interquartile range is the range of middle 50% of the data, in other words it is the distance between the $75^{th}$ percentile and $25^{th}$ percentile.

Quantile plots depict the cumulative distribution function. A quantile plot plots data values against the fraction of observations exceeded by the data value. Unlike box plot, quantile plot actually shows all observations.

The gplot procedure, which is part of SAS/Graph component, plots two or more variables on a two-dimensional coordinate axes. This procedure is useful in displaying series of data showing trends and patterns. It is also useful for interpolation and extrapolation. The gplot procedure can produce scatter plots, bubble plots, logarithmic plots, plots against second vertical axis and overlay plots.

The gchart procedure is also a part of SAS/Graph component. It is useful to display and compare exact and relative magnitudes of the data points, divide data into classes and examine its contribution to the whole and analyze the extreme data points that are out of order. The gchart procedure produces six different types of charts: block charts, donut and pie charts, horizontal and vertical bar charts and star charts. The procedure can calculate frequency and cumulative frequency counts, percentages and cumulative percentages, sums and means.

Figure 12:
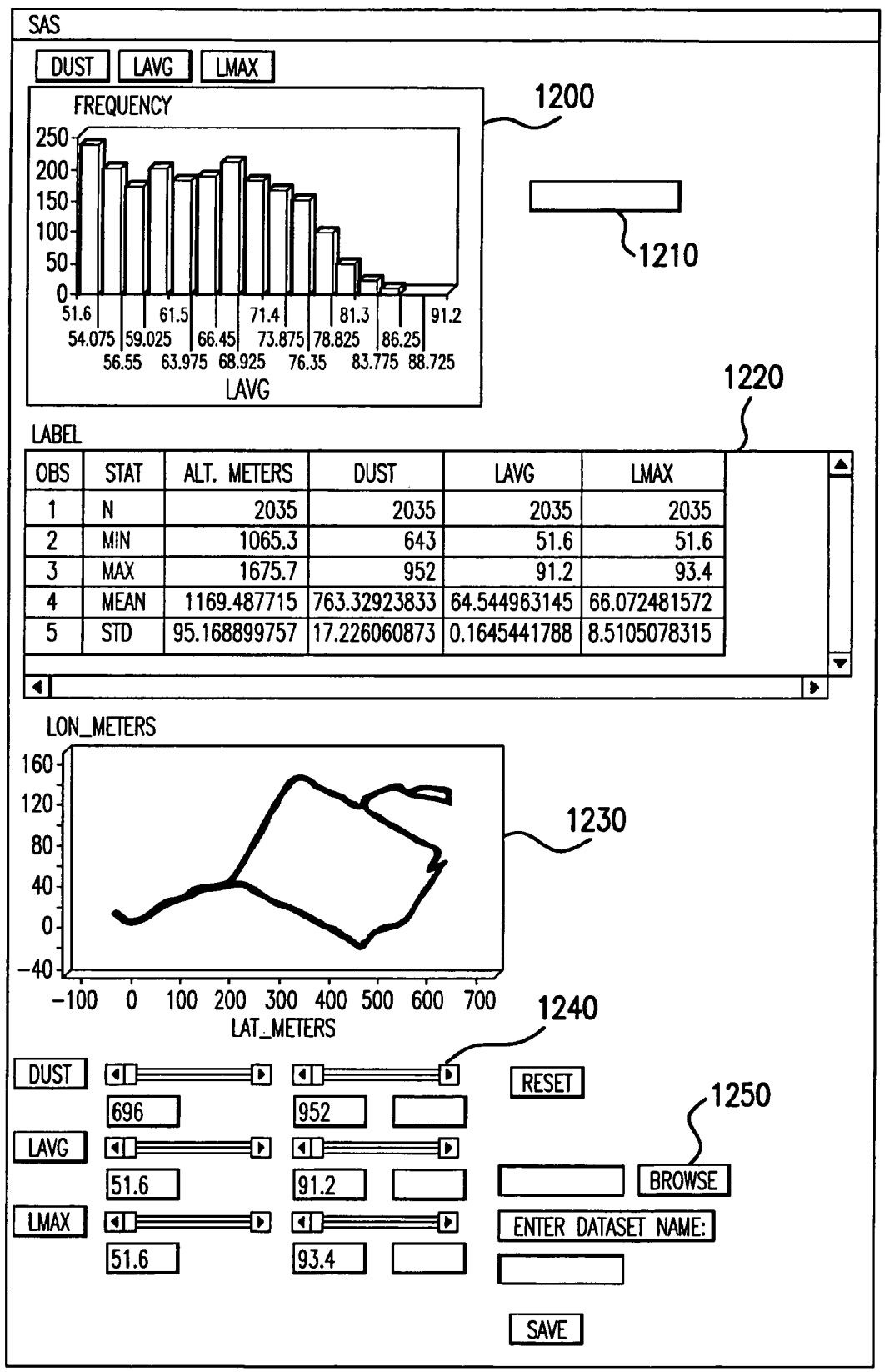
FIG. 12 illustrates an exemplary screen used for generating and displaying reports and summaries.

The graphical user interface screens shown in FIGS. 10 and 12 may be used to interact with the analysis software to produce analysis results in a desired form. The graphical user interface is developed using two frames: an initial data input frame, and an analysis frame. The initial data input frame shown in FIG. 10 collects the data from the user, and the next 'analysis' frame shown in FIG. 12 displays the data in charts and bars.

The two frames are not standard frames but are dialog frames as they provide a place to collect data from the user. The two frames are developed keeping in mind the researchers who use the application and their tasks. The necessary logic and business roles are applied using the SCL (SAS component language). SAS/AF application development environment includes a component window that contains a list of all available components. The list of components includes visual controls like check box, combo box etc, non-visual components like collection classes and non-visual models to access SAS® tables. Once a component is added to a frame, properties of each component can be changed by using properties window or by programmatically using SCL. To avoid confusion, all the properties may be modified using SCL in the application.

Using the dialog box 1000 shown in FIG. 10, the user registers the sensors used in the data log file by entering sensor acronyms. In other versions of the software, the sensor acronyms are not entered manually but are read from the raw data file. Using dialog box 1010, the raw text file is selected. The user clicks the browse button to open a dialog box that lets the user select a file. The dataset is named using box 1020. The dataset contains the original data of the text file. Using box 1030, the user selects a library name to store the above dataset. Clicking the Browse button opens a dialog box that lets user to select a library from the list of already existing libraries or create a new library. Clicking the Analyze button 1040 opens a new frame containing graphs and charts. The action related to analyze button creates all the permanent and temporary datasets. By default, the application treats the starting point as the reference point. Box 1040 adds flexibility to the user to specify another point as a reference point.

After the raw text file is converted to a SAS® dataset, the SAS® dataset may be used for report generation and graphical analysis. Report generation may be managed using a screen such as that shown in FIG. 12.

Referring to FIG. 12, data can be filtered using the scroll bars displayed below the longitude and latitude chart. The slide bars may be used to filter the master dataset. The user can select a range of values for each sensor to filter the data. Each sensor has two slide bars displayed, one on the left to select max value and one on the right to select min value of the range. The Reset button may be used to reset the dataset to use the master dataset.

The section on the right of the scroll bars may be used to save any interesting data for further study. Clicking on the Browse button selects a library, and a name may be entered for the dataset in the text entry field. Clicking on the Save button will save the dataset in the selected library. The information about the number of sensors and kinds of sensors, dataset name and library to store the dataset, may be entered by the user in the first frame shown in FIG. 10. One of the tasks is to store the information entered by the user in the first frame and use that information to communicate with the second frame shown in FIG. 12. This is achieved by creating a SASO global environment list (envlist) that persists for the entire session. The envlist follows a specific format for storing the information for frame—frame communication.

Another challenge is to plot the longitude and latitude on a two dimensional plot. SAS/Graph component has a Maps library that has information about demographics of all the counties in the USA, Canada and Europe and can locate any point precisely on the face of the earth, given longitude and latitude information. If a set of longitude and latitude is given as input to SAS/Graph it will plot two points relative to each other calculating the line between them. But a problem arises in that when 3 points are given, it will just draw a triangle, and when 4 points are given, a rectangle. When a user moves around with an LPS unit, the requirement is to detect the path of the user with the help of longitude and latitude so that the researcher can trace the places where the exposure levels are dangerous. So, when data are displayed using the SAS/Graph Maps capability, a complex polygon will be drawn connecting the first point to the last point, filling the area in between, which is of no reasonable meaning to the researcher. Having the starting point as a reference point and calculating the distance and the orientation of every other point with respect to reference point, can overcome the above problem. So, all dataset location information can be converted to distances in meters along two axes with respect to the reference point.

One of the disadvantages of this approach compared to using SAS Maps is that the software developed does not consider the curvature of the earth. While this approach is very effective for testing in limited to small geographical areas, like construction areas, agriculture fields and mines, it leads to distortions in displaying location information across a major fraction of the earth. Implementation of other SAS® modules, including those related to GIS, would help resolve such difficulties.

In an attempt to make the developed application modular, macros may be developed to handle the dynamic nature of the application. The number of buttons displayed and filtering mechanism is implemented using SAS® macros.

According to exemplary embodiments, the modified SASO software processes raw text data and presents it in a graphical and HTML and/or RTF format.

According to exemplary embodiments, the SAS software module may be implemented on a conventional PC, e.g., an Intel compatible Pentium class processor having an operating system, such as Windows 9x, Windows NT, Windows 2000 and a minimum 32 MB RAM. The software may create HTML reports using Java applets which use Java device drivers of SAS® software that can be viewed using conventional web browsers, such as Internet Explorer, Version 5 with Java virtual machine 5.0.0.3167 or higher and Netscape Navigator, Version 4.07 or later. Any conventional monitor may be used to view the reports, etc., generated by the software, including XGA (Extended Graphics Adapter), SVGA (Super Video Graphics Adapter). A screen resolution of 800×600 is recommended.

According to an exemplary embodiment, the LPS software requires following software products of SAS8.2 or higher version installed in the computer: Base SAS software; SAS/AF software; SAS/Graph.

As described above, the data from the LPS worker unit is downloaded into a text file. That text file is then imported into a modified SAS program. The program allows the user to analyze the data quickly and easily. The program creates frequency diagrams, performs descriptive statistics, and draws a graph of the area traversed by the worker. Other graphs may be created depicting signals from one or more sensors at locations where data were taken. Exemplary diagrams, tables, and maps generated using the SAS program are shown in FIGS. 11A–11S.

FIG. 11A shows a table providing descriptive statistics of analyzed data. For each of three sensors for which data were collected (DUST, LAVG and LMAX), the number of points, the minimum values, the maximum value, the mean and the standard deviation are reported. For each sensor for which the values can only be positive numbers (in this data set, only the DUST sensor), the descriptive statistics of the log-transformed values are also reported.

FIG. 11B illustrates an exemplary report of summary of position confidence information. As explained above, sometimes the GPS electronics do not receive information from enough satellites to allow the position of the LPS unit to be determined as accurately as when an optimum amount of satellite information is received. The table shown in FIG. 11B provides information related to the confidence in the position information provided by the GPS within the LPS. For example, "3DD" indicates "three dimensional differentially corrected position fix," the most accurate position information. This summary table makes it easy to tell that for 1383 time points out of the total number of 2032 time points when data were collected, the most accurate position information was available ("3DD"). The descriptive statistics for each of the numeric variables makes it easy to learn when and where the less accurate position information was obtained, also. Providing this table helps the user assess the quality of the position data.

FIGS. 11C–11E provide detailed descriptive statistics (quantiles of sensor values) for the sensor variables DUST, LAVG, and LMAX, respectively. For example, the table shown in FIG. 11E indicates that 99% of the LMAX sensor values that were recorded were equal to or smaller than 83.90 decibels and 95% were equal to or smaller than 79.70 decibels.

Figure 11F:
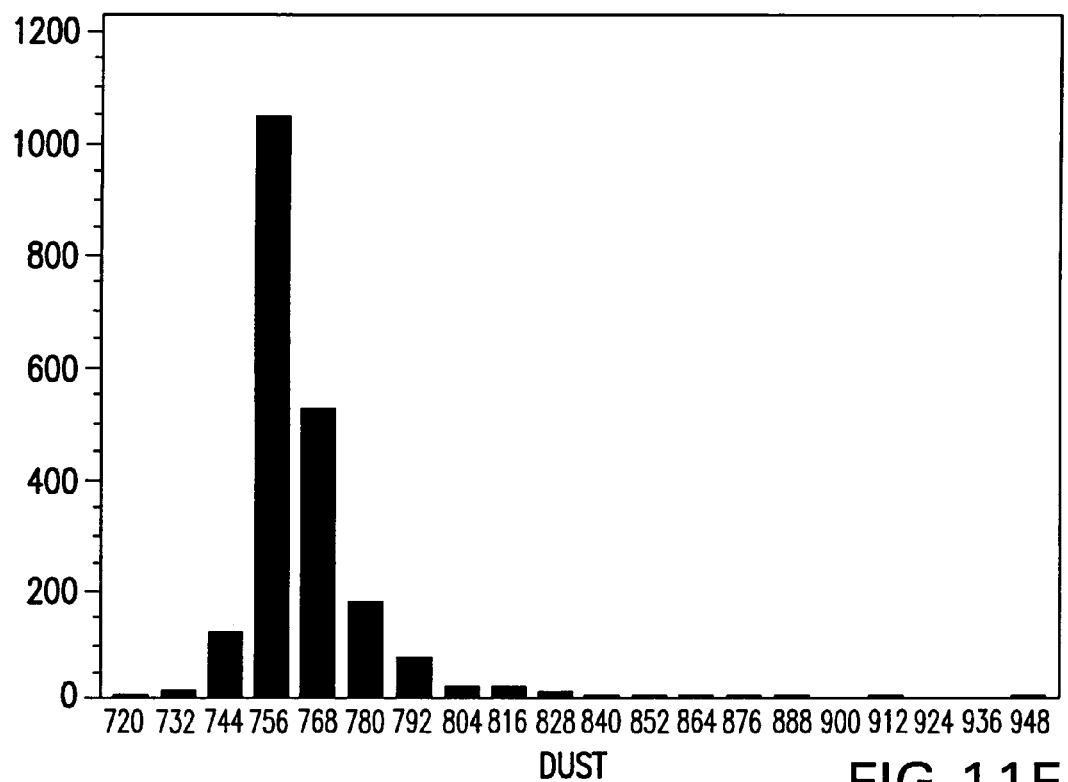
FIGS. 11A–11S illustrate exemplary reports, summaries, and tables generated by analyzing collected and correlated data.

FIG. 11F is a plot of the frequency distribution of DUST sensor values. Sometimes this is a "bell-shaped curve." This graph gives the number of data points for which the DUST value falls within a narrow range centered on 744, 756, 768, etc. micrograms per cubic meter. As shown, e.g., in FIGS. 11H and 11I, a similar plot may be provided for other variables LAVG and LMAX, respectively.

Figure 11G:
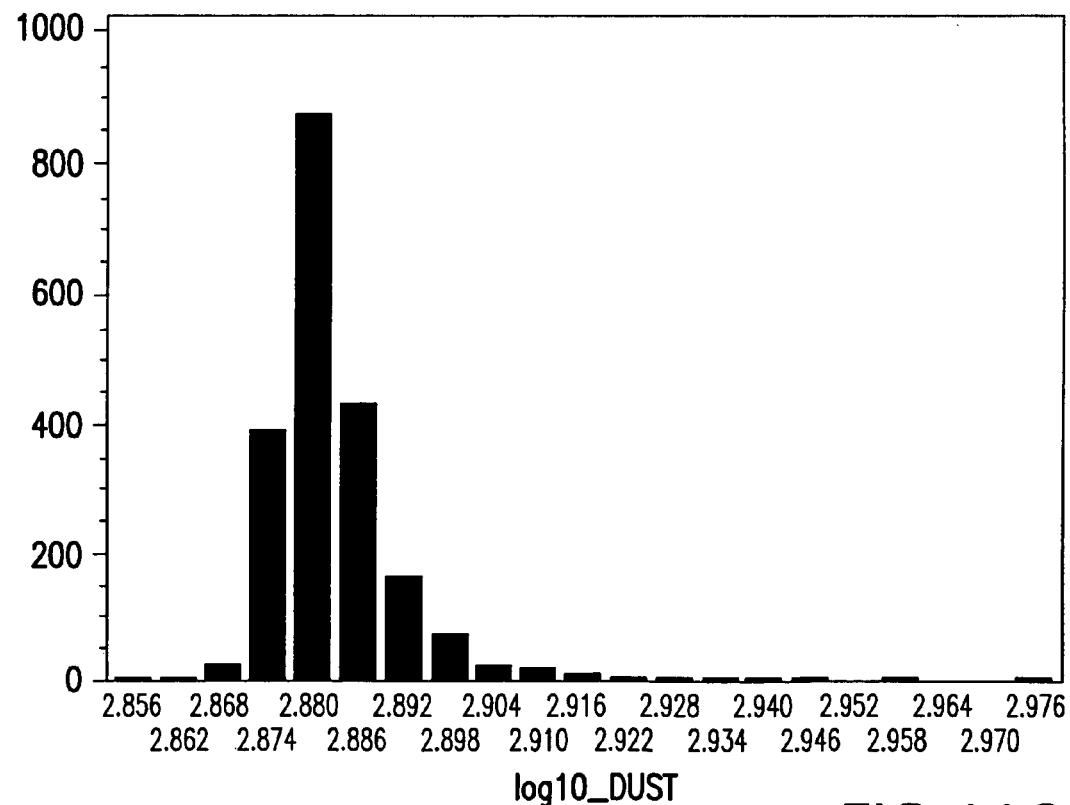
Figure 11H:
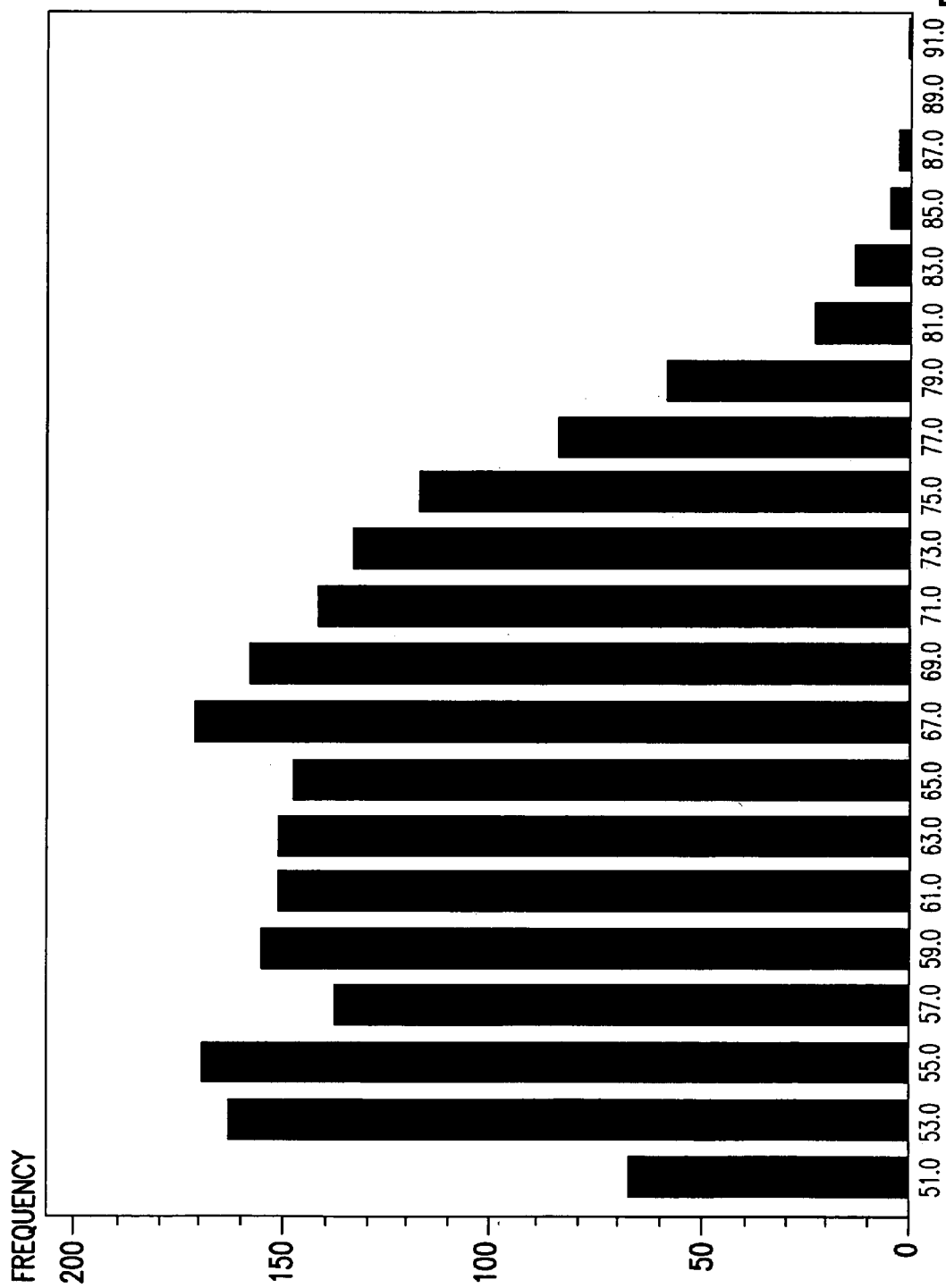
Figure 11I:
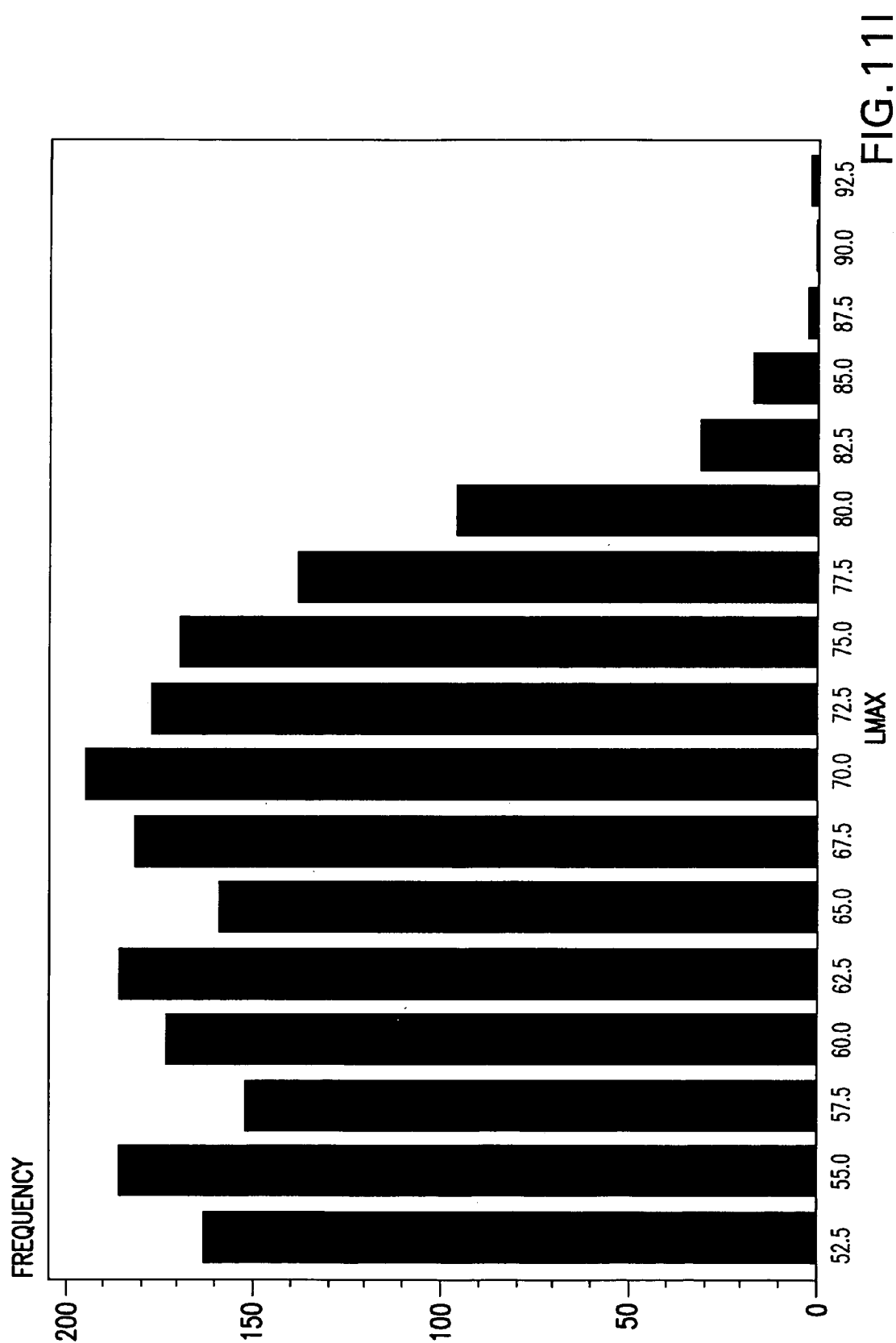

FIG. 11G is a plot of the frequency distribution of log-transformed DUST values. Sometimes this is a "bell-shaped curve." This type of plot may be provided only for sensors whose values are normally positive numbers.

Figure 11J:
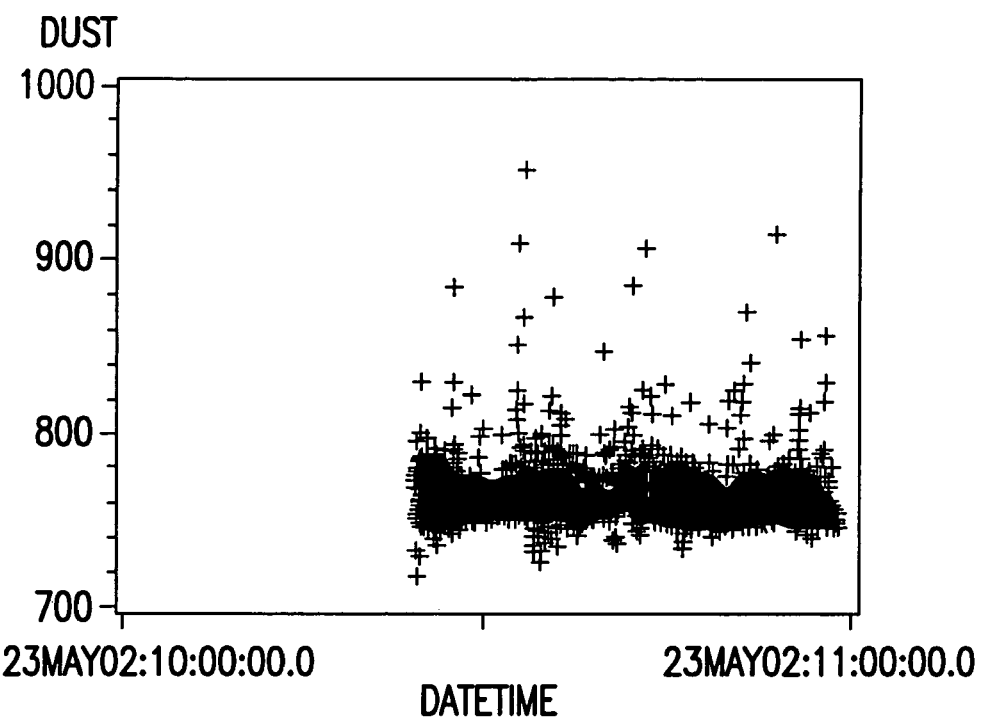
Figure 11K:
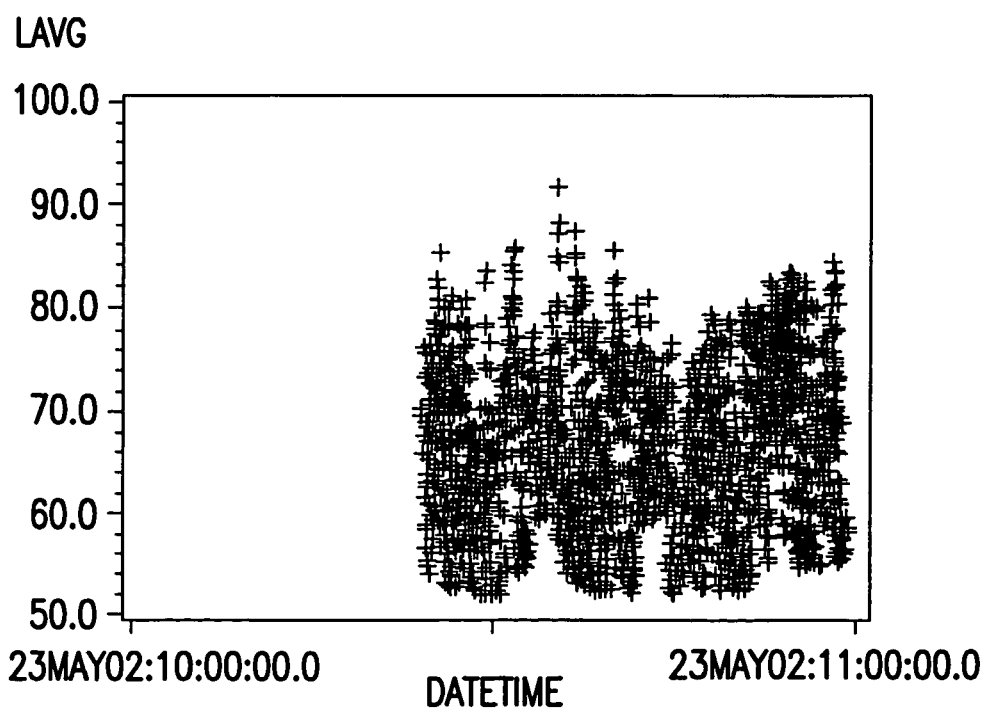
Figure 11L:
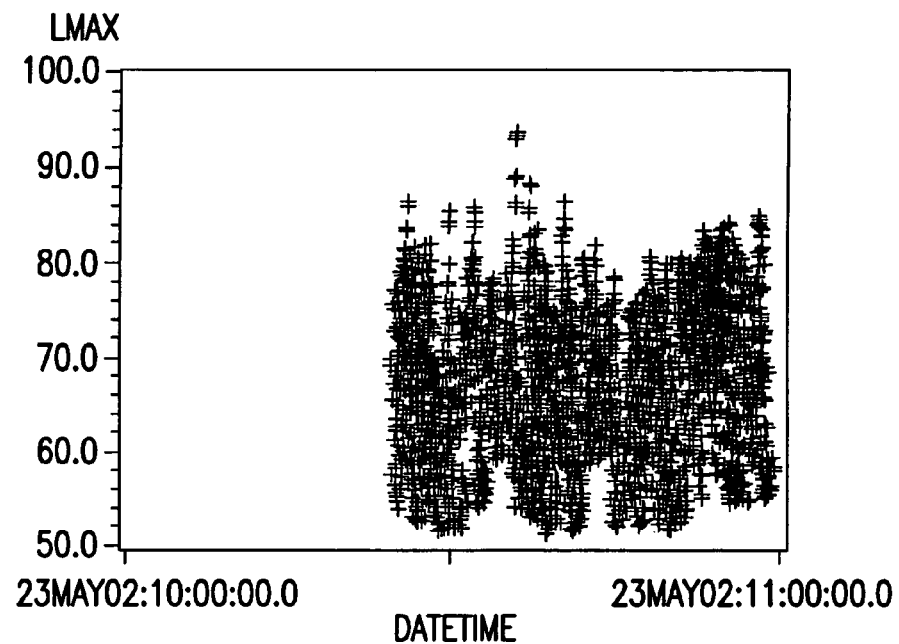

FIG. 11J is a plot of each DUST value against the time when that data value was recorded. It shows whether a sensor's measurement was changing over time. This type of plot may be provided for the other variables LAVG and LMAX, as shown in FIGS. 11K and 11L, respectively.

Figure 11M:
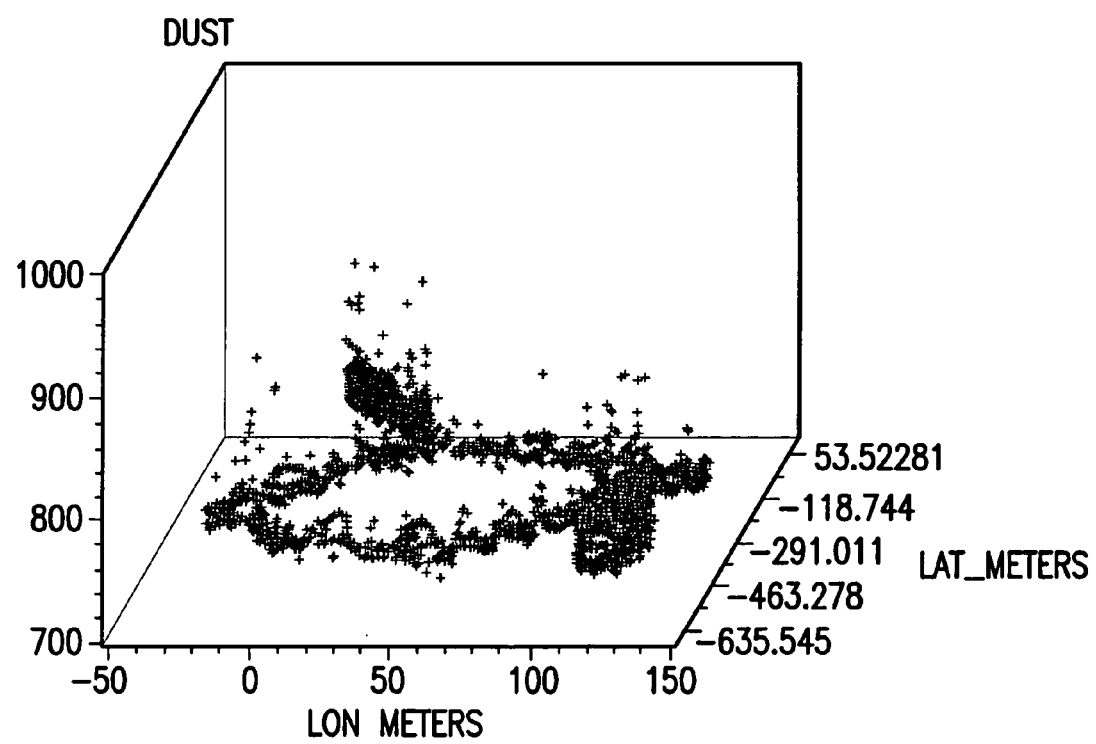

FIG. 11M is a three-dimensional plot of each DUST value recorded against position within the area where data were collected. It shows whether a sensor's measurement varied with position. The numerical value of lat_meters denotes the distance north (positive values) or south (negative values) of the reference position recorded as a latitude and longitude in the header of the first page of this report. The numerical values of lon_meters denotes the distance east (positive values) or west (negative values) of the reference position. Thus, "looking down at the graph from the top" provides a map-like view of the area where data were collected and the distance of each point from the "floor" indicates the amount of DUST that was measured at that position. One point is plotted for each DUST value included in the data being analyzed. Even though the plot is "map-like," distances are typically expanded or shrunk to allow all values to be plotted on the graph conveniently, resulting is a "map" that is distorted along one direction relative to the other.

One nice feature of this type of plot is that if the computer being used to view the report has a licensed copy of the necessary SAS® software modules (SAS is the underlying statistical software package used to develop the LPS data analysis application, in this case), then the report can be provided in such a form that the person viewing the graph can "grab" it with the mouse and rotate it and perform other manipulations in order to see data that are hidden behind other data or to examine parts of the graphed data in more detail.

Figure 11N:
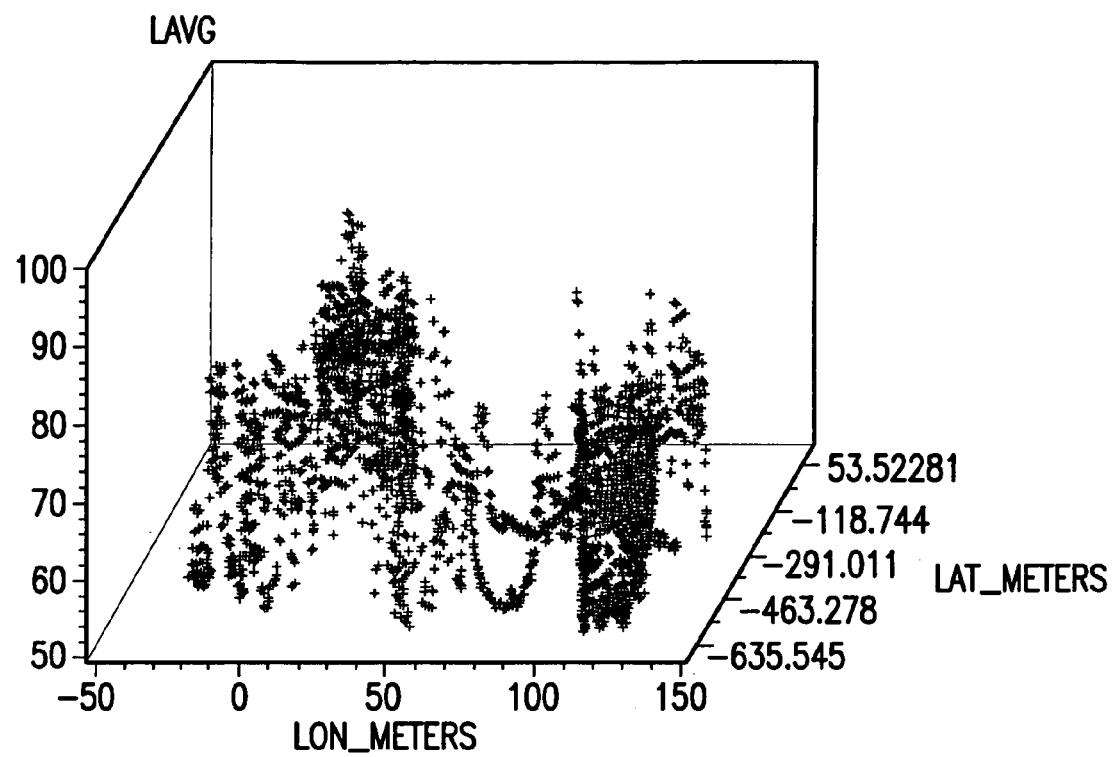
Figure 11O:
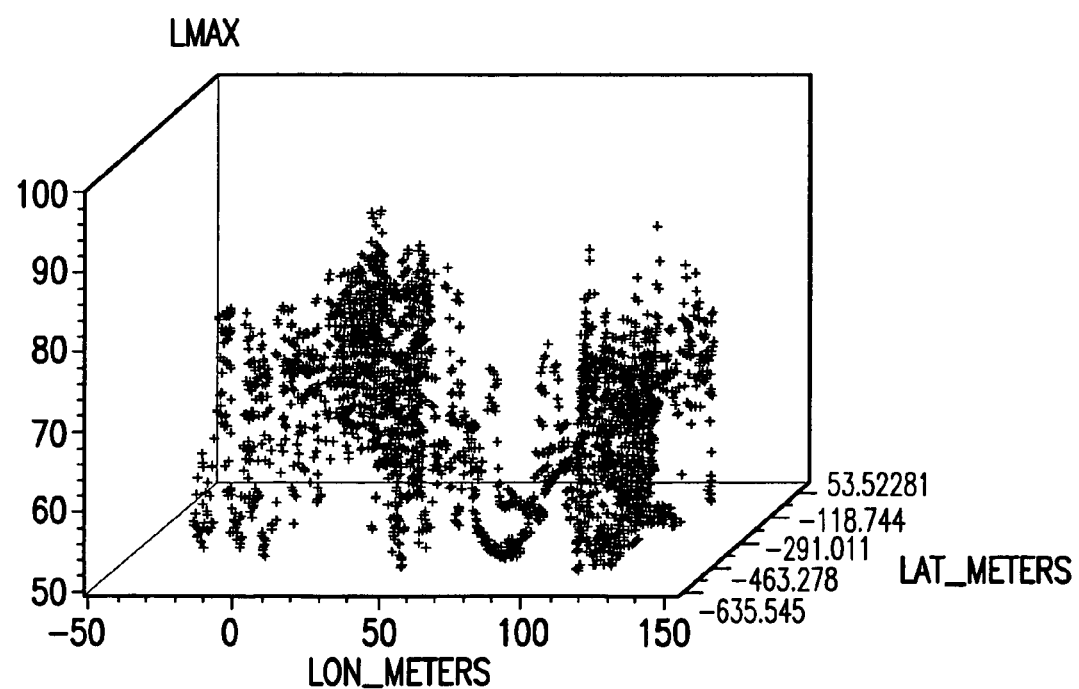

FIGS. 11N and 11O illustrate similar plots for the other sensor variables, LAVG and LMAX, respectively.

Figure 11P:
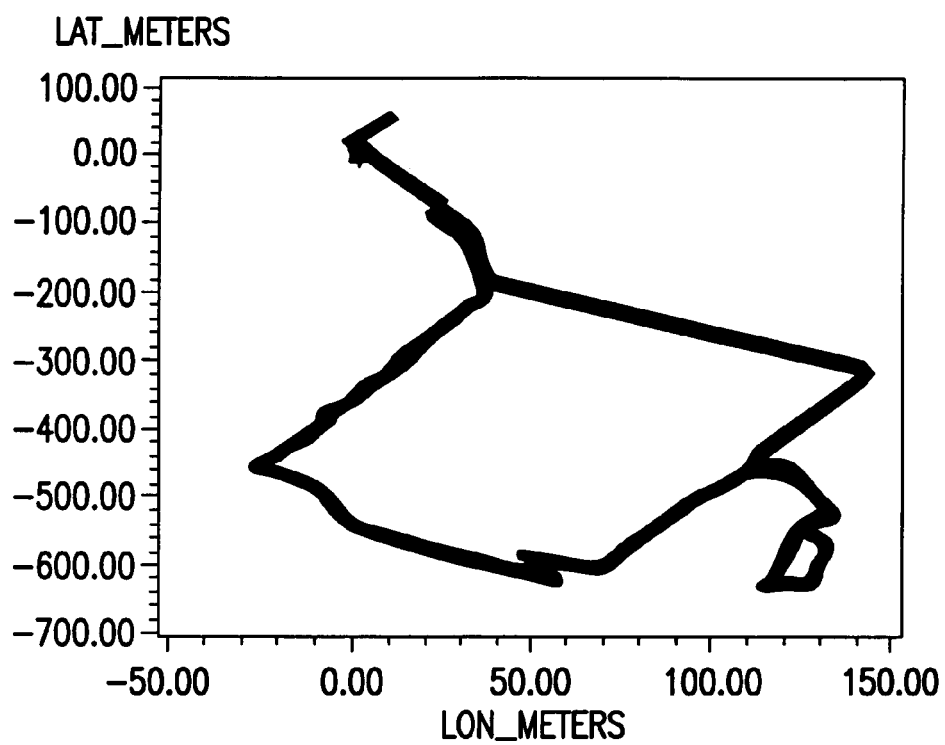

FIG. 11P illustrates an exemplary plot showing the locations where data were collected in a two-dimensional (map-like) graph.

Figure 11Q:
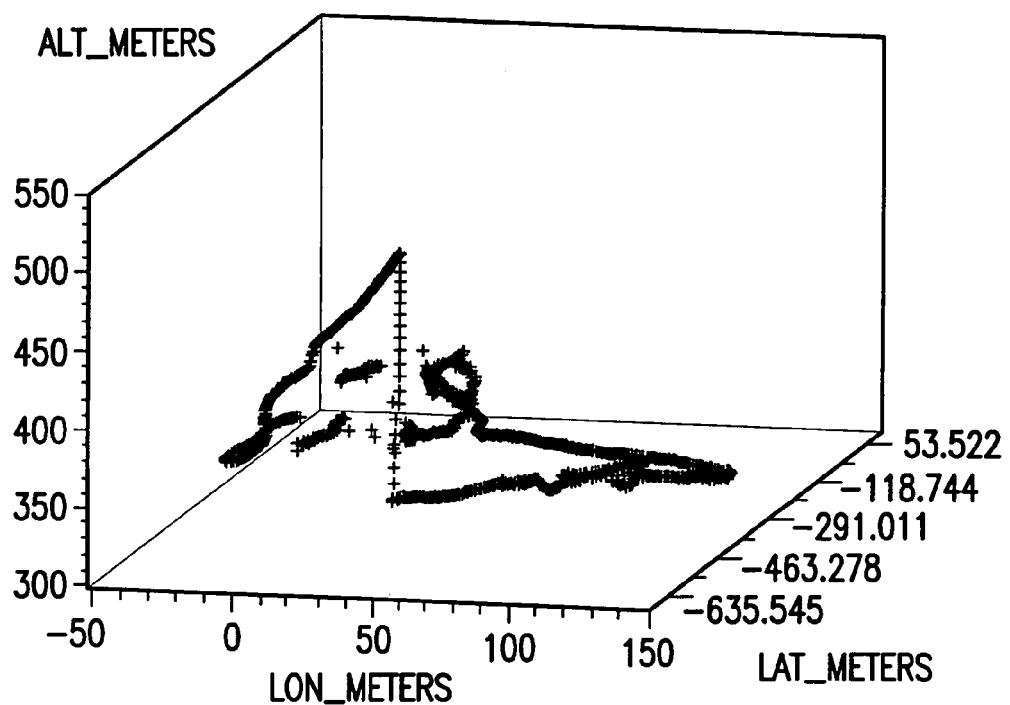

FIG. 11Q illustrates an exemplary plot showing the locations where data were collected in a three-dimensional graph that includes the altitude (meters above sea level) variable. The GPS system cannot measure altitude as accurately as latitude and longitude.

Figure 11R:
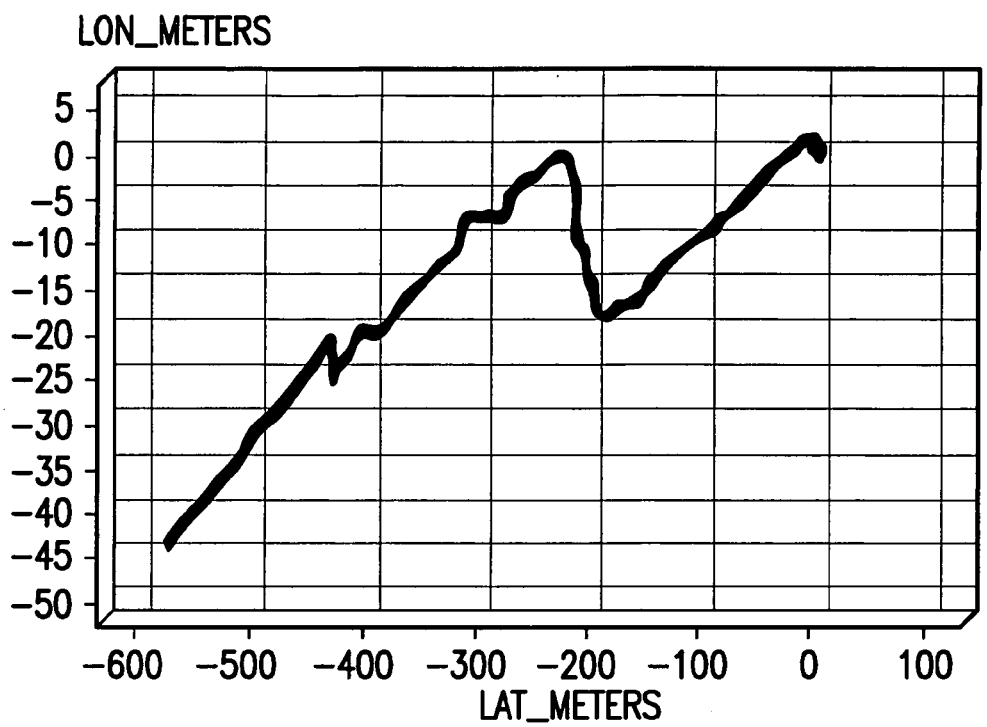
Figure 11S:
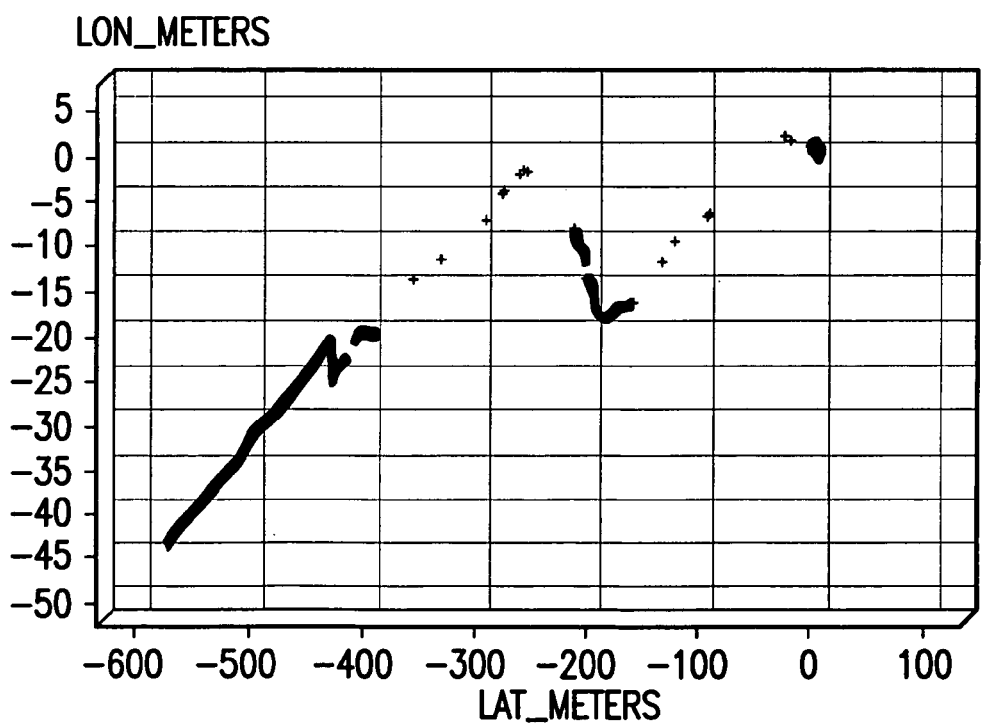

Filters can be used to determine "hot spots" encountered during the course of the work day. For example, FIG. 11R shows all positions and exposures for LMAX data, but FIG. 11S shows only the position of exposures of LMAX above 85 dBA.

As explained above, the reports, diagrams, and statistics generated may be presented in an analysis frame such as that shown in FIG. 12. In FIG. 12, the analysis frame contains a histogram for each sensor data, summary statistics and GPS plot with filtering mechanism. Histograms may be displayed for each sensor in a box 1200. The Generate Report button 1210 to the right of histogram charts may be used to generate HTML reports. Buttons may dynamically appear depending on the number and type of sensors the user registered in the initial frame. Clicking each button displays the frequency bar chart for each sensor. When the user filters the data, the charts are updated to the filtered dataset. This may be implemented using histogram control of SAS/AF software.

Section 1220 shows the summary statistics of each sensor. The information contains number of observations, minimum, maximum, mean and standard deviation for each sensor data. The statistics are generated using means procedure.

Section 1230 charts the longitude and latitude in meters (0,0) represents the reference point which by default is the starting point of the observation. This is achieved by first converting longitude and latitude information into meters. Scatter plot control is used to plot the graph.

Section 1240 represents the filtering part of the application. Filtering tools are displayed for each sensor dynamically depending on the type of sensor. The filtering mechanism has two scrollbars and two text entry boxes for each sensor. A user can change the values using the scroll bar whose min and max are updated depending on user selection. Instead, the user can also enter values in the text entry boxes and click set button for that sensor to view the plot for the readings between the values entered in the text entry boxes. SAS® has fast processing capability in filtering the data and updates and displays the location chart instantaneously. The reset button resets the dataset used to display data to the original dataset.

Section 1250 allows the user to save any interesting filtered data with a new file name. The browse button enables user to select the library in which the dataset is stored.

The button 1210 generates HTML reports in, e.g., a c:\lps\html folder. The report contains summary statistics, percentile information for each sensor, frequency plots for each sensor, location plot using longitude and latitude and also the plots for each sensor versus time.

Frequency plot, location plot and time plots are java applets and can be manipulated inside an HTML browser. These plots can also be drilled down and reset. Drill down capacity gives user the flexibility to navigate through the data by selecting a designated area on the chart so that the data is displayed in more detailed fashion. HTML plots are displayed only in the computers with SAS® as the special drill down capability needs java plugins supplied by SAS®. FIGS. 13 and 14 show an exemplary HTML report.

HTML reports have a table of contents section with results generated using the means procedure, univariate procedure, gchart procedure and gplot procedure. The report is generated using SAS ODS (Output Delivery System) by selecting only the required portions of procedure outputs. FIG. 13 shows how data can be presented in the form of static tables that cannot be modified. The means procedure displays summary of the data and the quantiles portion of univariate procedure displays percentiles of the dust sensor.

The charts produced by gchart and gplot procedures may be created as java applets that can be displayed in a browser and can perform interactive animations and instant calculations. Right clicking the mouse on the plot will give various options like changing the axis parameters, look of the graph. Users can also select certain area with in a plot to drill down. FIG. 14 shows the position graph as an applet.

SAS ODS provides similar capabilities for creating rich text format (RTF) reports, which can be viewed with modern word processing software.

Figure 15:
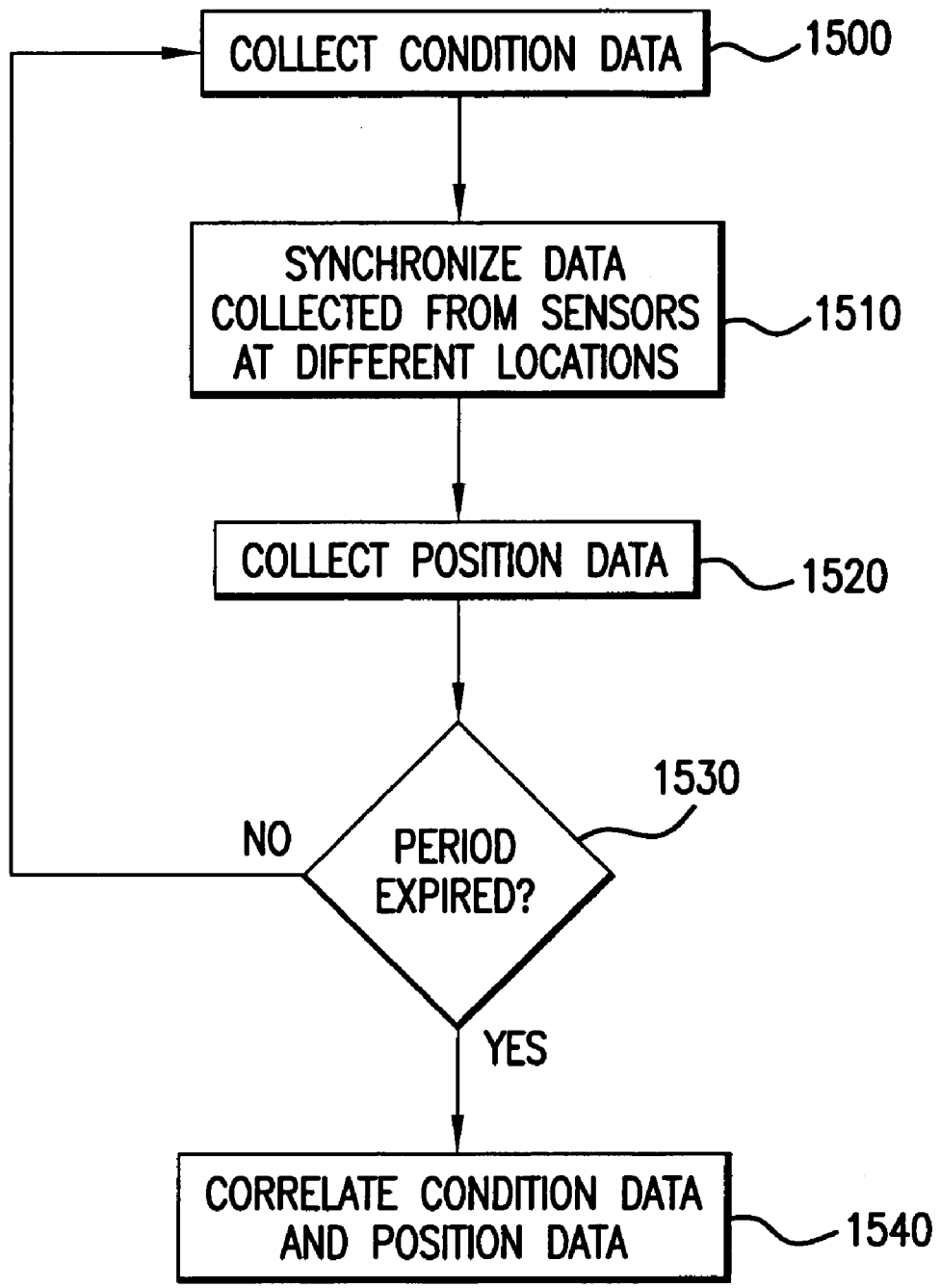
FIG. 15 illustrates an exemplary method for assessing conditions.

FIG. 15 illustrates an exemplary method for assessing conditions. The method begins at step 1500 at which real-time condition data indicative of conditions is collected. The data may be collected from at least one sensor at a particular location or from a plurality of sensors at different locations. For sensors at different locations, the real-time condition data collected from the plurality of sensors is time synchronized at step 1510 to produce data indicative of conditions at the different locations at one or more times. At step 1520, real-time position data indicative of the location(s) of the sensor(s) is collected. Steps 1500 and 1520 are repeated over time at one or more locations. The collected real-time condition data is correlated with the collected real-time position data at step 1530 to produce correlated data indicative of conditions at the one or more locations over time. The correlated data may then be analyzed as described above.

Figure 16:
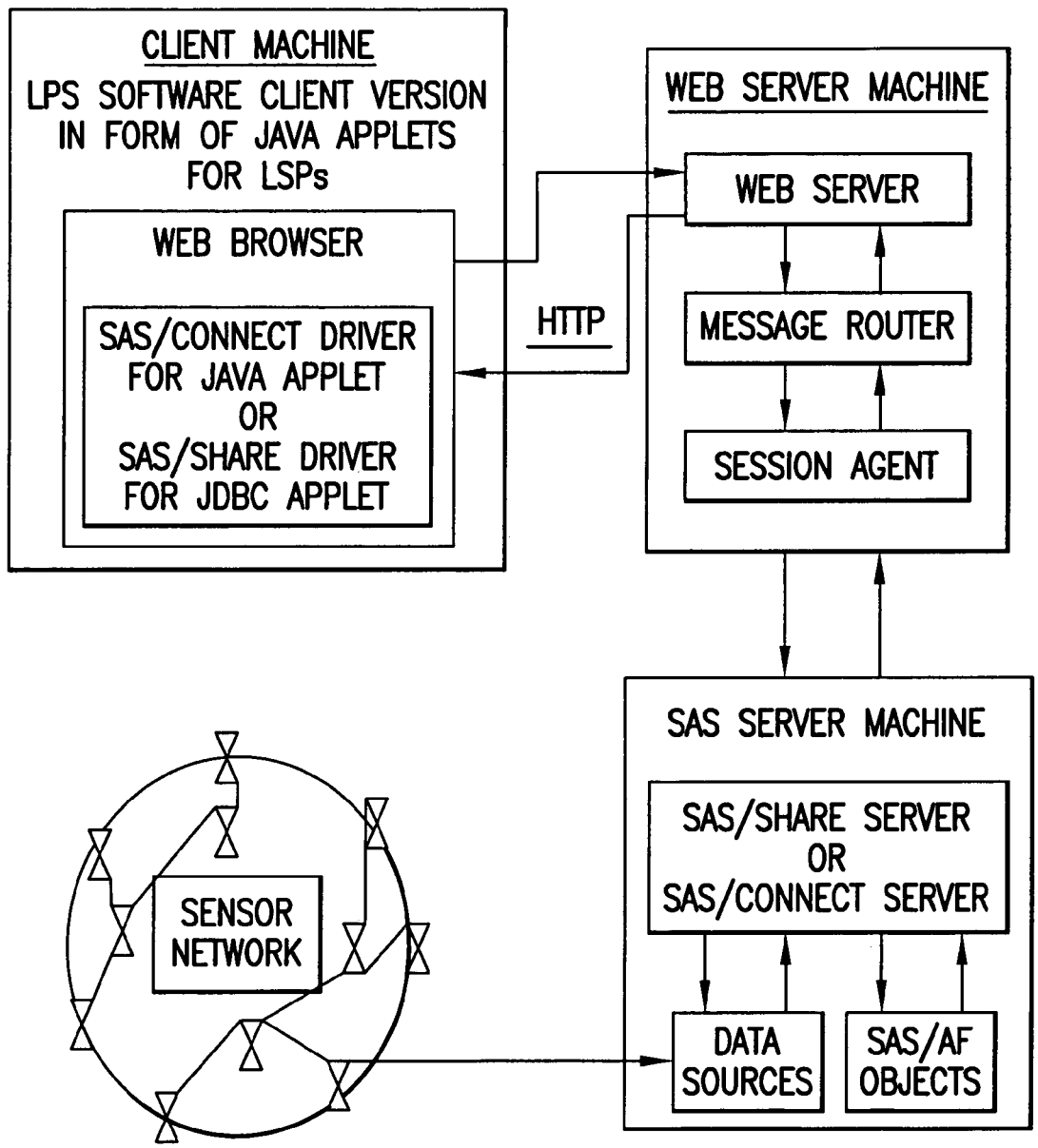
FIG. 16 illustrates a exemplary implementation in a web-based network.

According to exemplary embodiments, the LPS software may be enhanced by simultaneously delivering the information to multiple divergent users in real time via the web for remote monitoring of test sites. An exemplary implementation of the sensor network in a web-based environment is shown in FIG. 16.

As a solution to meet the challenge of simultaneous data delivery, SAS® offers various tools to make the application distributed and web based. SAS® provides interfaces to open source technologies like Java, JSP (Java Server Pages) and LDAP (Lightweight Directory Access Protocol) that enable the developer to create client-server solutions, portable Java applets, applications, and servlets that leverage the power of the SAS software. SAS Enterprise integration Technologies bundle allows the SAS server platform to integrate with other applications and opens the SAS System on the server to all clients. Three components of SAS®, SAS/Connect, SAS/Share and SAS/IntrNet, provide appropriate client-server solutions. SAS Integration Technologies are built on these three to provide open client access to the SASS software.

SAS/Connect component gives local access to files and SAS® software on various remote hosts to use with a local machine. With this software the user can build a local graphical user interface that directs the processes to the remote server and returns results back on to the local machine. The LPS software is a SAS/AF application, and using SAS/Connect developers are no longer limited to accessing objects only within their local environments. By distributing objects on a remote host, multiple users can access those objects using SAS/Connect remote sessions. The Remote Library Services of SAS/Connect provide transparent access to remote data. The data residing in remote libraries is transferred to the local machine through the network as the local execution requests it. Similarly, Remote Compute Services of SAS/Connect can be used to remotely execute the complex tasks of filtering data and comparing and analyzing the data required by the LPS application.

The SAS/Share component is a data server that gives multi user access to SAS files. Combined with SAS/Connect, SAS/Share provides an ideal platform for the applications like LPS software where the data is constantly updated and is accessed by many users. SAS/Share also provides access privilege security features for server operations. SAS/Share can be used to store SAS® datasets and SAS/AF objects, and SAS/Connect can be used to access those files to deliver the data to the clients.

Using SAS/IntrNet software, one can build and distribute applications over the internet or an intranet. Using SAS/IntrNet, thin-client applications can be developed. Thin-client solutions using a Web browser are attractive, as the user does not need to install any software. The browser will automate the process. SAS® implements thin-clients using Java applets with access to SAS server. Since applets are Java programs, in order to run them, JVM (Java Virtual Machine) is required on the client's machine. Current versions of Netscape navigator and Microsoft Internet Explorer contain JVM as part of standard installation.

Three components of the SAS/IntrNet software that are appropriate to make LPS software a distributed application are: SAS/Connect driver for Java; SAS/Share driver for Java; and SAS Tunnel Feature.

The SAS/CONNECT driver for Java provides the API (Application Programmer Interface) that enables Java programs (either applets or JSPs) to communicate with SAS/Connect server running at a remote location and access the computing services of SAS software. It also lets the SAS server to return the results to the browser-based client. Using SAS/Connect driver for Java, Java programs can start a SAS session, connect to that session, create datasets, read existing datasets, run SAS procedures to analyze data and retrieve the results.

The SAS/SHARE driver for JDBC (Java Database Connectivity) is a set of Java classes you can use to create Java applets, JSPs and Java applications that communicate with a SAS/Share server. Unlike SAS/Connect Java driver, it allows the Java programs to view and update data by submitting SQL queries and statements through a direct connection with the SAS server. Using this driver not only allows access to data residing on the SAS server but also to the data that resides in foreign databases like Oracle. In order to use JDBC, the client must create an instance of the JDBC driver and then use the server URL (Unified Resource Locator) to connect to the server.

The SAS tunnel feature is helpful in breaking some of the restrictions of the Web server to the Java clients. Most browsers today do not allow Java programs to connect with any other objects or applications that are not on the Web server. This restriction requires a SAS server to be installed in the Web server. The tunnel feature eliminates the restrictions of the Web server and firewall by employing HTTP (Hyper Text Transfer Protocol) tunneling that allows Java programs to communicate with SAS server. The Web server directs the SAS requests from the Java applets and JSPs to the Message Router, a CGI (Common Gateway Interface) program that creates a SAS session with SAS server. Results of the requests are passed back to the Session Agent, which then passes the data to the Message Router. The Message Router passes the results to the Web server, which ultimately passes to the Java client.

All the topics discussed above are put in perspective in the FIG. 16. SAS/AF objects can be stored on the server for processing. The client must know about the object location and its calling conventions. This information is stored in class metadata that support the objects access to the client.

The LPS application serves as a framework and as an alternate solution to existing software development technologies for anyone who wants to develop applications in SASO. Existence of drag and drop facility in SAS/AF environment has made the application development much easier and more efficient. Further enhancements, like making it distributed by integrating with Java technologies and using wireless sensor networks, can be made. Many real world problems can be solved with SAS efficiently using built in statistical procedures.

This invention offers field researchers, industrial hygienists, safety inspectors, and other users an integrated, personal, hand-held electronic instrument that will precisely correlate multiple exposure levels as measured by connected off-the-shelf real time personal monitors with position coordinates of the user and acquisition times when utilizing the publicly available Global Positioning System (GPS). The data may be analyzed after collection and/or the data may be made available at a central location, via, e.g., telemetry, for analysis or redistribution. This invention includes the optional capability for higher resolution position discrimination when used in conjunction with a compatible portable telemetry linked reference data corrections unit.

The invention may be useful in areas such as the following: outdoor occupational exposure assessment with various real-time sensors/monitors, detecting chemical/biological conditions on soldiers, construction workers, agricultural workers, survey and clean-up, landfill workers, strip-mining workers, highway workers and road crews, inspectors, HAZMAT crews, geologists and volcanologists, environmental inspectors, and site surveyors, as well as for inventory control of materials stored outdoors, landmine explosive) detection and display, meter reading, and vehicle tracking. The invention may also be applied to indoor positioning and sensor applications when position signals are available, such as greenhouses, circus tents, etc. The invention may also be applicable where GPS signals are viable outdoor without large multiple signal components. The invention may also be useful for all types of indoor data logging with time synchronization without position information.

It should be understood that the foregoing description and accompanying drawings are by example only. The invention is not limited to the examples described above. A variety of modifications are envisioned that do not depart from the scope and spirit of the invention.

What is claimed is:

1. A method for assessing conditions, comprising the steps of:
   collecting real-time condition data indicative of conditions from at least one sensor at a particular location;
   collecting real-time position data indicative of the location of the sensor;
   repeating the steps of collecting the real-time condition data and the real-time position data over time at one or more locations;
   correlating the collected real-time condition data with the collected real-time position data to produce correlated data indicative of conditions at the one or more locations over time; and
   analyzing the correlated data to determine conditions at the one or more locations over time and to produce data indicative of the accuracy of the collected position data.

2. A method for assessing conditions, comprising the steps of:
   collecting real-time condition data indicative of conditions from at least one sensor at a particular location;
   collecting real-time position data indicative of the location of the sensor;
   repeating the steps of collecting the real-time condition data and the real-time position data over time at one or more locations;
   correlating the collected real-time condition data with the collected real-time position data to produce correlated data indicative of conditions at the one or more locations over time; and
   correcting the position data.

3. A method for assessing conditions, comprising the steps of:
   collecting real-time condition data indicative of conditions from at least one sensor at a particular location;
   collecting real-time position data indicative of the location of the sensor;
   repeating the steps of collecting the real-time condition data and the real-time position data over time at one or more locations;
   correlating the collected real-time condition data with the collected real-time position data to produce correlated data indicative of conditions at the one or more locations over time; and
   correcting the position data in real-time with differential global positioning system (DGPS) data received using telemetry or with data received using a wide area augmentation system (WAAS).

4. An apparatus for generating data indicative of conditions, comprising:
   at least one sensor for collecting real-time condition data indicative of conditions at a particular location;
   a receiver for collecting real-time position data indicative of the location of the sensor, wherein the real-time condition data and the real-time position data are collected at one or more locations over time;
   a correlator for correlating the collected real-time condition data with the collected real-time position data to produce correlated data indicative of conditions at the one or more locations over time, and a means for correcting the position data.

5. An apparatus for generating data indicative of conditions, comprising:
   at least one sensor for collecting real-time condition data indicative of conditions at a particular location;
   a receiver for collecting real-time position data indicative of the location of the sensor, wherein the real-time condition data and the real-time position data are collected at one or more locations over time;
   a correlator for correlating the collected real-time condition data with the collected real-time position data to produce correlated data indicative of conditions at the one or more locations over time; and a means for correcting the position data including a telemetry receiver that receives differential global positioning system (DGPS) data or means for receiving correction data using a wide area augmentation system (WAAS) for correcting the position data in real time.

6. An apparatus for analyzing data indicative of conditions, comprising:
   a receiver for receiving data including real-time condition data indicative of conditions collected from at least one sensor at a particular location correlated with real-time position data indicative of the location of the sensor, wherein the condition data and the position data are collected at one or more locations over time; and
   a processor for analyzing the received data to determine conditions at the one or more locations over time, wherein the processor produces data indicative of the accuracy of the collected position data.

* * * * *

UNITED STATES PATENT AND TRADEMARK OFFICE
CERTIFICATE OF CORRECTION

| | | |
|---|---|---|
| PATENT NO. | : 7,191,097 B1 | |
| APPLICATION NO. | : 10/815111 | |
| DATED | : March 13, 2007 | |
| INVENTOR(S) | : Larry A. Lee et al. | |

It is certified that error appears in the above-identified patent and that said Letters Patent is hereby corrected as shown below:

Column 2, line 54, replace "a exemplary" with --an exemplary--

Column 3, line 63, replace "and or/a" with --and/or a--

Column 5, line 2, replace "and provider" with --and provide--

Column 11, line 42, replace "53DU" with --3DU--

Column 14, line 34, replace "SAS/AS" with --SAS/EIS--

Column 14, line 35, replace "SAS/AS" with --SAS/EIS--

Column 15, line 46, replace "efficient and effective" with --efficiently & effectively--

Column 15, line 47, replace "programmer to modularize" with --programmer modularize--

Column 15, line 55, replace "SASO" with --SAS®--

Column 16, line 55, replace "crating" with --creating--

Column 19, line 22, replace "SASO" with --SAS®--

Column 19, line 63, replace "SASO" with --SAS®--

Column 23, line 28 replace "SASS" with --SAS®--

UNITED STATES PATENT AND TRADEMARK OFFICE
CERTIFICATE OF CORRECTION

PATENT NO. : 7,191,097 B1
APPLICATION NO. : 10/815111
DATED : March 13, 2007
INVENTOR(S) : Larry A. Lee et al.

It is certified that error appears in the above-identified patent and that said Letters Patent is hereby corrected as shown below:

Column 24, line 51 replace "SASO" with --SAS®--

Signed and Sealed this

Thirty-first Day of July, 2007

JON W. DUDAS
*Director of the United States Patent and Trademark Office*